US008462913B2

(12) United States Patent
Evans et al.

(10) Patent No.: US 8,462,913 B2
(45) Date of Patent: Jun. 11, 2013

(54) DETECTION OF X-RAY SCATTERING

(75) Inventors: Paul Evans, Nottingham (GB); Keith Rogers, Swindon (GB)

(73) Assignees: Nottingham Trent University, Nottinghamshire (GB); Cranfield University, Bedfordshire (GB)

( * ) Notice: Subject to any disclaimer, the term of this patent is extended or adjusted under 35 U.S.C. 154(b) by 435 days.

(21) Appl. No.: 12/602,760

(22) PCT Filed: Jun. 2, 2008

(86) PCT No.: PCT/GB2008/001891
§ 371 (c)(1), (2), (4) Date: Jun. 7, 2010

(87) PCT Pub. No.: WO2008/149078
PCT Pub. Date: Dec. 11, 2008

(65) Prior Publication Data

US 2010/0254514 A1 Oct. 7, 2010

(30) Foreign Application Priority Data

Jun. 2, 2007 (GB) .................................. 0710579.4

(51) Int. Cl.
*G01N 23/207* (2006.01)

(52) U.S. Cl.
USPC ............................................ 378/73; 378/147

(58) Field of Classification Search
USPC ................................ 378/73, 84, 86, 147–160
See application file for complete search history.

(56) References Cited

U.S. PATENT DOCUMENTS

| | | | | |
|---|---|---|---|---|
| 3,539,808 | A | 11/1970 | Hahn | 250/308 |
| 5,008,911 | A | 4/1991 | Harding | 378/86 |
| 5,602,893 | A | 2/1997 | Harding | 378/86 |
| 6,483,894 | B2 * | 11/2002 | Hartick et al. | 378/147 |

FOREIGN PATENT DOCUMENTS

| | | |
|---|---|---|
| DE | 10 2005 039 642 | 2/2007 |
| GB | 2 359 717 | 8/2001 |
| WO | WO 2006/048882 | 5/2006 |

* cited by examiner

*Primary Examiner* — Courtney Thomas
(74) *Attorney, Agent, or Firm* — Merchant & Gould P.C.

(57) ABSTRACT

A radiation detecting apparatus includes a collimator and a detector, the collimator having a material for blocking radiation and a region that is a sector of an annulus or multiple regions in a configuration in the shape of a sector of an annulus for allowing transmission of the radiation. The detector is spaced a distance from the collimator such that when a radiation source and sample crystal material are positioned at suitable positions, the radiation is collimated by the collimator and contacts the sample a predetermined distance from the detector at multiple of locations corresponding to the region or regions of the collimator. The Bragg diffracted radiation from the crystal material at two or more and preferably all of the locations overlap at the detector.

19 Claims, 30 Drawing Sheets

Figure 17a
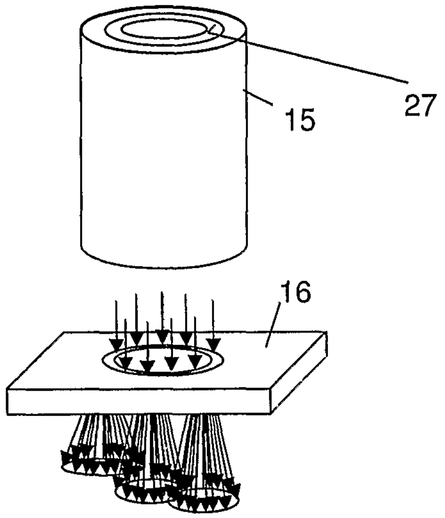
Figure 17b
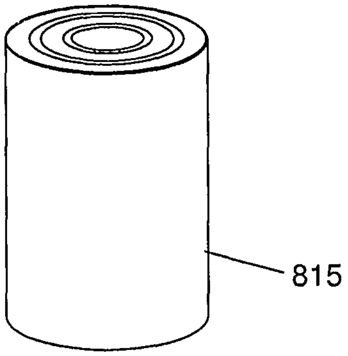
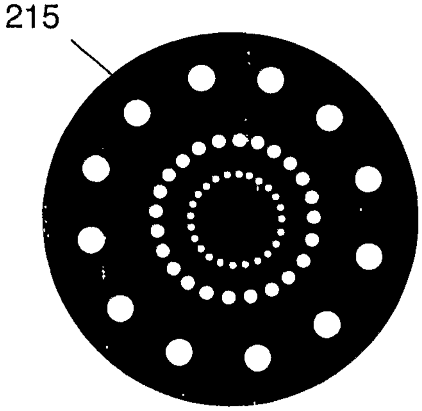
Figure 17c

DETECTION OF X-RAY SCATTERING

This application is a National Stage Application of PCT/GB2008/001891, filed 2 Jun. 2008, which claims benefit of Serial No. 0710579.4, filed 2 Jun. 2007 in Great Britain and which application(s) are incorporated herein by reference. To the extent appropriate, a claim of priority is made to each of the above disclosed applications.

BACKGROUND OF THE INVENTION

This invention relates to detection apparatus for scattered small wave length radiation such as X-rays from an object and a method for detecting scattered small wavelength radiation such as X-rays from an object.

SUMMARY OF THE INVENTION

It is known to image objects using X-rays by measuring X-ray absorption. Typically these involve having an X-ray source and detector with a sample in between them. The primary X-ray beam is directed towards and hits the sample, with some of the X-ray radiation being absorbed, a smaller amount being scattered and the remainder going on to hit the detector. Since different materials can exhibit different amounts of absorption, and X-rays pass through materials which are opaque to visible light, it is possible to image the inside of an object if it contains different materials or different thicknesses of the same material. It is also possible to attempt to work out the type of material the sample is made of from the absorption characteristics.

A medical X-ray will typically be able to penetrate soft tissue to show bones.

Security X-ray devices in airports are reasonably effective for imaging the shape of a structure however their reliance on the absorption characteristics of the objects under inspection produces low overall accuracy in terms of material identification. For example dual-energy X-ray imaging exploits the difference in atomic cross section between the photoelectric absorption and the Compton scattering processes inferred by the relative change in magnitude of a high-energy X-ray signal and a low-energy X-ray signal. Consequently an appropriately calibrated X-ray system may be employed to broadly discriminate an inspected object into a limited number of material classes. The discrimination information may be presented to the human observer by colour coding the resultant X-ray images. Thus security personnel in an airport might review the contents of bags going through an X-ray scanner and by looking at the pseudo colours displayed as well as the shape to identify anything suspicious. In general such techniques allow for crude discrimination of materials and not the identification of precise material useful to find explosive substances or contraband drugs for example.

Such X-ray absorption techniques can be used in real time and on every day objects.

It is also known to solve the structure of a crystal by analyzing the diffraction pattern produced by X-rays through that crystal. This is known as X-ray crystallography.

A small portion of a primary X-ray beam incident onto a crystal is scattered at measurable angles if its wavelength is similar to the lattice distances (or d-spacing) present in the crystalline material under inspection. For ideal, polycrystalline materials interrogated by pencil beams, the photon scatter follows a cone distribution, with the source of the scattering at the cone apex. These "Debye cones" form circular patterns when they intersect a flat detector normally. These circles have a common centre coincident with that of the incident beam position on the detector. The angular distribution of the scattered intensity is unique to each different crystal structure and thus can be used to identify a material and determine characteristics such as lattice dimensions, crystallite size and percentage crystallinity. The key relationship between the lattice spacing (d), and the scatter angle (θ) is embodied within the well known Bragg condition: $\lambda=2d\sin\theta$, which (where $\lambda$=X-ray wavelength).

It allows for structure of a large number of molecules of different materials including inorganic compounds to be determined. Ordinarily this is done with single crystals though it is possible to obtain significant information from powdered material or from thin films. This technique allows a large amount of information about materials to be determined. However, even where powders rather than single crystals are used it is a requirement to prepare a custom made small sample which is then bombarded with X-rays perhaps over many hours to provide adequate detection and subsequent analysis of the diffraction pattern.

Conventional powder diffractometers utilize detectors to scan and measure a portion of the resultant diffraction pattern. This angular dispersive technique usually employs monochromatic X-rays. Data collection and analysis have been based mainly on one-dimensional (1D) intensity profiles obtained with scanning point detectors or linear detectors. The linear detector is often referred to in the field as a position sensitive detector or PSD. The use of 2D image sensors (array or area detectors) may be used to speed up the collection of data in comparison to point or line detectors. However the collection process is still relatively slow.

Some of the commonly used X-ray scattering techniques are: single crystal diffraction (SCD), X-ray powder diffraction (XRPD), high-resolution X-ray diffraction (HRXRD), X-ray reflectometry (XRR) and small angle X-ray scattering (SAXS). In general diffractometers are laboratory instruments which are designed for off-line inspection requiring relatively long periods of data collection from carefully prepared samples.

Whereas X-ray absorption imaging involves looking at the primary X-ray beam and noticing any reduction in its intensity, X-ray crystallography looks at scattered X-ray radiation to attempt to calculate the angle at which the scattered radiation has been diffracted by the crystal structure. One of the main reasons for the slowness of the latter procedure is that the amount of radiation that is scattered is relatively low and therefore the intensity of the X-ray radiation being measured in X-ray crystallography is low requiring long integration periods to accumulate a sufficient amount of signal for accurate measurement.

For these and other reasons X-ray crystallography can be a very effective technique in laboratories for slow analysis but would not generally be suitable for every day objects or for use in "real time" or "on-line" inspection applications.

Whilst these two separately known systems have been discussed together here because of their relevance as background to the invention the two fields of X-ray imaging by absorption and X-ray crystallography are not normally seen as being closely related. As well as the differences between one being much slower and confined to the laboratory, X-ray crystallography looks at the scatter of X-rays whereas X-ray absorption looks at the primary beam each technique disregarding the portion of the radiation considered by the other.

As well as X-rays Bragg diffraction may occur whenever the wavelength is of a similar magnitude to the lattice spacing. So particles such as neutrons or electrons can be used if at the correct energy.

It is an object of the current invention to at least mitigate some of the problems mentioned above for the prior systems. In particular it is an object to provide apparatus and method for using radiation/X-ray diffraction to send information about materials of a sample without requiring a special preparation of the sample and for this to be done in a relatively short time frame and/or to result in a significant reduction in the time required for data collection facilitates the inspection of large samples with dimensions in meters. This is particularly beneficial when the material atomic structures define macroscopic material properties. Diffraction is not only more accurate than absorption for analyzing material it enables detection of smaller quantities. For example luggage and freight screening systems at airport checkpoints have difficulty in detecting sheet explosives such as Semtex when the thickness is of the sheet presented to the interrogating X-ray beam is of the order of a few millimeters or less.

According to a first aspect of the invention there is provided a radiation detecting apparatus comprising a collimator and a detector, the collimator comprising a material for blocking radiation and a region or a plurality of regions in a configuration for allowing transmission of the said radiation, the detector being spaced a distance from the collimator such that when a radiation source and sample comprising a crystal material, are positioned at suitable positions the radiation is collimated by the collimator and contacts the sample a predetermined distance from the detector at a plurality of locations corresponding to the region or regions of the collimator, the Bragg diffracted radiation/Debye cone from the crystal material at two or more and preferably all of the plurality of locations overlap at the detector.

According to a second aspect of the invention there is provided a method of detecting scattered radiation from a sample, comprising the steps of radiating through a collimator to generate a curtain of radiation or a plurality of radiation portions in a substantially circular or the sector of a circle configuration, placing a sample at a distance from the collimator so that a predetermined profile in the sample is irradiated, and placing a radiation detector a distance from the sample so that Bragg scattered radiation form at least two non adjacent parts of the profile overlap at the detector.

Preferably the sector at least 180 degrees in extent.

Preferably the collimator comprises a substantially annular region or a plurality of regions in a substantially annular configuration for allowing transmission of said radiation and/or the region is an aperture or regions are apertures and/or wherein the plurality of locations are in a substantially circular configuration.

Preferably the radiation source is spaced the appropriate distance from the collimator. and/or the radiation of the wavelength is less than 1 nm and/or the radiation comprises neutrons and/or the radiation source is an X ray source.

Preferably the detector is in line with the centre of the region or configuration of regions of the collimator and/or the paths of scattered radiation are coincident at the surface detector and/or there is or uses adjusting means for adjusting the distance between the detector and collimator, Preferably the output from the detector is displayed or used to adjust to correct position by searching for an increase in magnitude of detected radiation and/or there are multiple detectors positioned at multiple depths for detecting Bragg scattered radiation from multiple materials.

Preferably the sample is operably placed between the collimator and detector.

Preferably there is provided a housing encompassing the detector, collimator and preferably the radiation source, the apparatus configured for the sample to be placed on the opposite side of the detector to the collimator.

Preferably the collimator is between sample and detector cutting out radiation not from the particular angle corresponding to the desired Debye cones. and/or the detector collimator comprises a plurality of portions defining channels for allowing radiation form Debye cones of plurality of predetermined angels the portions blocking radiation not from those angles and/or the collimator comprises a plurality of substantially annular regions or substantially annular configuration of plurality of regions, the detector or detectors spaced so that scattered radiation from two or more locations formed by each annulus in the collimator overlap at a detector more preferably wherein the collimator comprises a first element with a plurality substantially annular configurations of plurality of regions, the regions in each of the annular configurations being out of phase with each other and a second element with a plurality substantially annular configurations of plurality of regions, the regions in each of the annular configurations being out of phase with each other and a second element, the two elements being moveable relative to each other so that one or more of the configurations of regions align an one or more do not align such that x-rays incident onto the collimator or collimated by only some of the configurations.

Preferably there is provided a computer in communication with the detector for analyzing the radiation detected and calculating a material present in the sample and/or the curtain generated is substantially an annular sector or complete annulus and the profile is substantially circular or the sector of a circle. and/or comprising the steps of translating the sample through the curtain of radiation and integrating the Bragg scattered radiation received from points on the different profile on the sample formed as it is translated, the Bragg scattered radiation from at least two points on its translation path arriving at substantially the same location at the detector.

BREIF DESCRIPTION OF THE DRAWINGS

Embodiments of the invention will now be described, by way of example only, with reference to the drawings, in which:

FIG. 1 is a schematic view of X-ray scatter gathering apparatus in accordance with the invention, FIG. 2 is a view of the footprints of Debye cones generated at the receiving surface of the apparatus in FIG. 1, FIG. 3 is a chart of the intensity of X-rays received at the surface in FIG. 1 and FIG. 2 depicted against the distance from a given point on the surface.

FIG. 4 is a schematic view of a second embodiment of X-ray scatter collecting apparatus according to the invention, FIG. 5 is a schematic view of a third embodiment of X-ray scatter gathering apparatus in accordance with the invention, FIG. 6 is a schematic view of a fourth embodiment of X-ray scatter gathering apparatus in accordance with the invention, FIG. 7 is a schematic view of a fifth embodiment of X-ray scatter gathering apparatus in accordance with the invention, FIG. 8 is a schematic view of a sixth embodiment of X-ray scatter gathering apparatus in accordance with the invention, FIG. 9 is a schematic view of a seventh embodiment of X-ray scatter gathering apparatus in accordance with the invention, FIG. 10 is a schematic view of an alternative configuration of the embodiment of FIG. 9, FIG. 11 is a schematic view of an eighth embodiment of X-ray scatter gathering apparatus in accordance with the invention, FIG. 12 is a schematic view of a ninth embodiment of X-ray scatter gathering apparatus in accordance with the invention, FIG. 13 is a schematic view of a tenth embodiment of X-ray scatter gathering apparatus in accordance with the invention, FIG. 14 is a view of a combination of the embodiments of FIGS. 9 and 10, FIG. 15 is a further alternative configuration using different detector apparatus of the embodiment of FIG. 11, FIG. 16 is a schematic view of an eleventh embodiment of X-ray scatter gathering apparatus in accordance with the invention, FIG. 17 shows different collimators, FIG. 18 is a view of an array, and FIG. 19 is a view of an integrator FIGS. 20*a* and 20*b* are X-ray beam footprints;

FIG. 21 is a view of a sensor sampling intensity of more than one hotspot;

FIG. 22*a* is a view of using the apparatus with a linear object;

FIG. 22*b* is a view of adffractometer;

FIGS. 23*a* and 23*b* are views of a ring collimator;

DETAILED DESCRIPTION OF THE PREFERRED EMBODIMENT(S)

Figure 1:
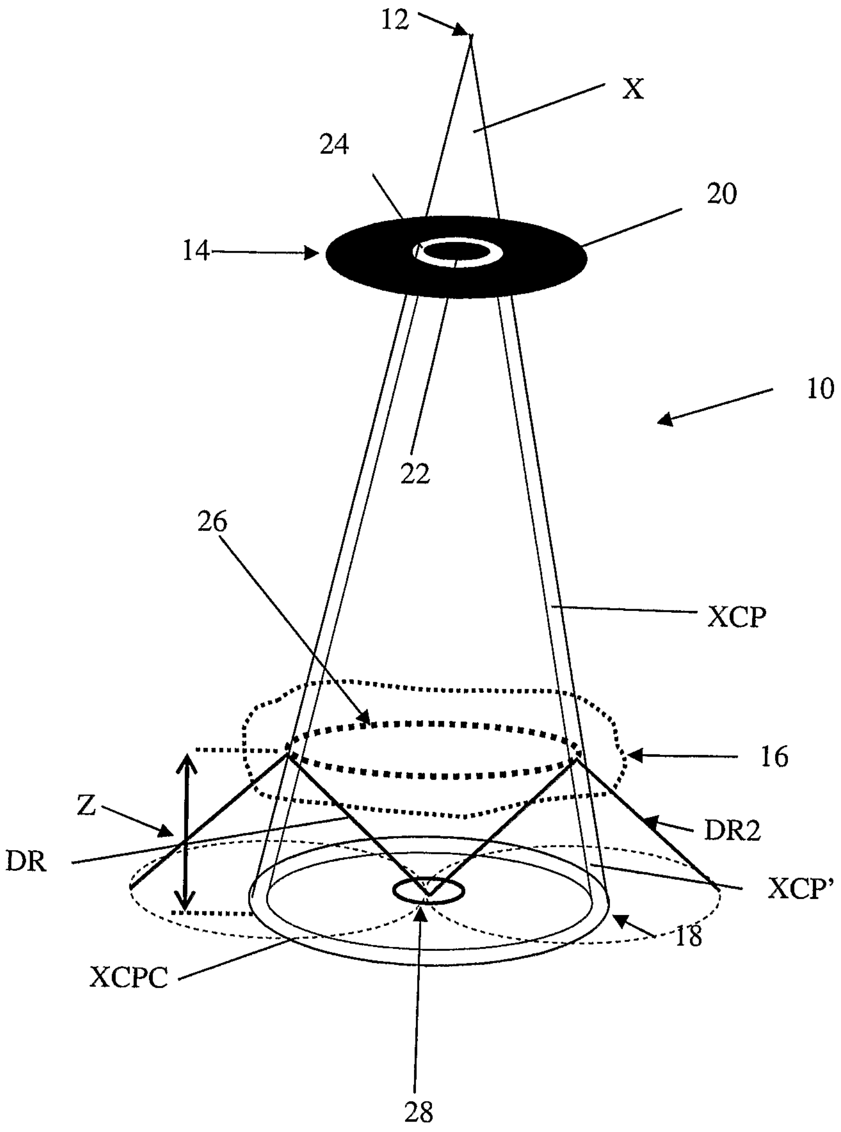

In FIG. 1 is shown X-ray scatter gathering apparatus 10. The apparatus comprises an X-ray source 12, a ring collimator 14, a target object 16, and a detection surface 18 which includes a detector or sensor (not shown).

Ring collimator 14 is made from a conventional material that might typically be used for collimating X-rays, such as tungsten or steel. Any material can be used so long as it can significantly block the path of X-rays. Non conventionally the ring collimator 14 comprising a first annulus of material 20, a circular disc of material 22 with a diameter smaller than the inner diameter of the solid annulus 20 and located within it. The collimator 14 also comprises an annular aperture 24 between disc 22 and annulus 20. All three of the annulus 20, annular radius 24 and disc 22 have the same centre point defining their radius. The disc 22 may be held in its position relative to the annulus 20 by any appropriate means such as being attach via thin wire or by being held in place using electromagnets. In alternative embodiments annulus 20 is not circular, any outer shape is suitable as it blocks the primary beam but the shape of the inner aperture is substantially circular The target object 16 is the target from which the apparatus 10 it is designed to detect diffracted X-rays., and contains a material suspected to be a polycrystalline material which it is wished to identify. The target object can be of numerous forms but in the example depicted in FIG. 1 it is a plate like object which has a width larger in diameter than the curtain XCP, described below, but does not have a substantial depth.

In this embodiment detection surface 18 comprises an actual surface, but alternatively it can merely be a name given to a plane of a hypothetical surface with no solid surface present. Somewhere on the surface 18 (or alternatively along the plane) is a sensor. Preferably the sensor is located at the centre of surface 18 directly in line, in respect of the X-ray source, with the centre of the ring collimator 14.

In use the X-ray source produces a cone of X-rays X which is aimed towards and therefore incident on the ring collimator 14. The disc 22 and annulus 20 made of attenuating material then block the majority of these X-rays X. However, X-rays do go through the annular aperture 22 and this results in the producing of a conical curtain of X-rays XCP. The cross section of the conical curtain XCP will be a narrow annulus of X-rays, that is the X-rays are present in the shape of a band between a first cone and a second cone which can be imagined to be positioned at a point slightly higher than the first cone, a further possibility, depending on the size of the source 12, is that the cones share the same primary axis and apex position but have different opening angles.

The conical curtain XCP hits the target object 16. Since the target object is substantially planar the conical curtain XCP hits the object 16 in a circular target path 26. Some of these X-rays will be scattered by the lattice of the target object 16 by Bragg diffraction and some absorbed, but much of the primary X-ray will continue. There is a substantially continuous X-ray curtain XCP' which then hits the detection surface 18 a distance Z from the target object 16, forming an annulus of primary X-rays XCPC at that surface 18.

In the embodiment described the sensor is present at the centre of the surface and has a radius sufficiently small that it is contained within the inner radius of annulus XCPC and therefore none of the primary X-ray beam is detected.

Because the target object 16 contains a polycrystalline material with a certain d spacing there is X-ray diffraction causing a scatter of the photons in a conical distribution. As mentioned above these are known as 'Debye cones' and they are generated from every point along the circular target path 26 so long as the crystal structure is present. Two such Debye cones are marked in FIG. 1 as DR and DR2. For reasons which may be clearer from reference to FIG. 2 it is found that a hotspot 28 can be generated in the centre of the detection surface 18 provided the distance Z is set correctly and for this reason the detector is preferably designed to be coincident with hotspot 28.

Figures 2A, 2B, 2C:
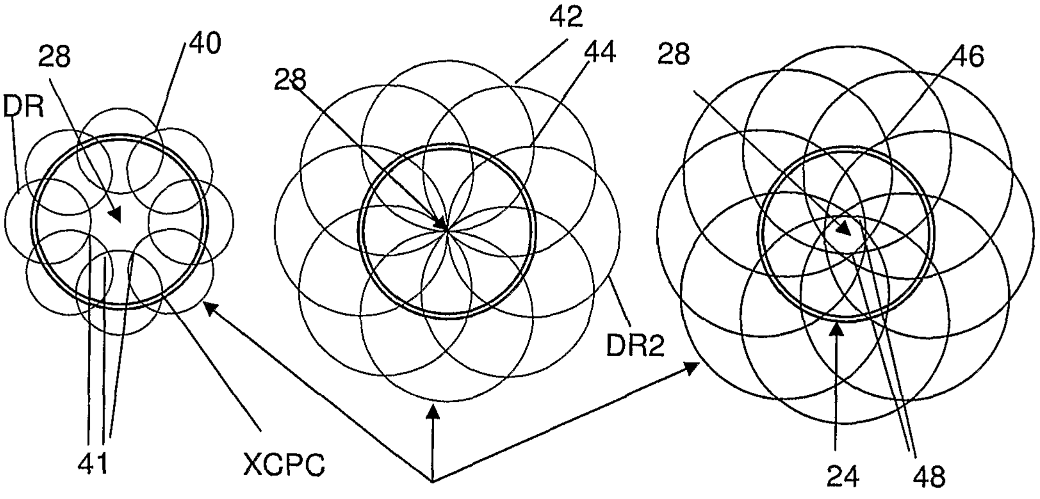

In FIG. 2 is shown a superposition of the cross-sections/footprints of some Debye cones from the target object 16 at the detection surface 18 with different distances Z shown in FIGS. 2*a*, 2*b* and 2*c*. In all three examples the annulus of primary X-rays XCPC is illustrated for comparison purposes In FIG. 2*a* the detections surface 18 is at a distance Z where the diameters of the Debye cones is still significantly smaller than the diameter of the circular target path 26. As can be seen there is a series of circles produced by Debye cones including circles corresponding to DR and DR2. At certain points the circles overlap such at point 40 thus increasing the intensity at the point to approximately double elsewhere on the circle. However there are no circular paths through the centre resulting in an approximately zero intensity of X-rays in the centre, a hotspot where the sensor is present.

In FIG. 2*b* the detection surface 18 is at a distance Z where the diameters of the Debye cones are equal to the diameter of the circular target path 26. In FIG. 2*b* there are numerous overlapping points such as point 42 and point 44 where two or three cones coincide increasing the intensity of X-ray radiation at those points. Most significantly however, all of the cones contribute to the intensity at the very centre of detection surface 18 at hotspot 28 where the sensor is present. Accordingly the intensity of radiation at this point is greatly increased.

In FIG. 2*c* the detections surface 18 is at a greater distance Z where the diameters of the Debye cones are now significantly larger than the diameter of the circular target path 26. In this example there are several points of overlap between the circles of the Debye cones such as points 46 and 48. However there is no point where all of the cones are coincident. Significantly none of the circles pass through the centre/hotspot 28 and therefore there is approximately zero intensity of X-rays in the centre where the sensor is present.

Accordingly there is substantially zero X-ray radiation detected at the sensor at the hotspot 28 in diagrams 2*a* and 2*c* whilst there is a great intensity from each of the cones concentrating on a single point in the vicinity of 2*b*. For this reason for a particular polycrystalline material that it is wished to be identified the d spacing and therefore the scattering angle can be calculated so that for a given ring collimators 14 and distance between collimator and sample the correct distance Z can be calculated where the situation in FIG. 2*b* should exist with the Debye cones having the same diameter as the of the circular target path 26 in the plane of the sensor. The distance can be fine tuned in practice by moving any of the target object 16, collimator 14 or detection surface 18 so that the maximum radiation intensity is found.

The massive difference in intensity at the centre between the situations in FIGS. 2*a*, 2*b* and 2*c* merely depending on the distance Z allows for the apparatus 10 to be used for an unspecified polycrystalline material. The target object 16, collimator 14 or detection surface 18 can be linearly moved whilst still in line with each other until the detector picks up the large reading of intensity at the centre associated with the situation in FIG. 2*b*. The distance Z, distance between ring collimator 14 and detection surface 18 and target object 16 can be measured allowing the angle of scatter of the Debye cones and therefore the d spacing to be calculated. The material can then be identified.

In FIG. 2 for ease of illustration the footprint of the Debye cones are shown, as circular. This situation implies the Debye cones emanate from a fixed height from the detector and result from a cylindrical curtain of primary X-rays. In fact the cross section of Debye cones including cones DR and DR2 in FIG. 1 when intersected by a plane normal to the right conical curtain of primary X-rays will produce elliptical patterns. However, this observation will not change the working principle of the invention and is believed to be easier to illustrate with circles rather than ellipses.

It can also be seen that in FIG. 2*a* there is a circular configuration of intersection points 41. Since there are a very large number of evenly spaced Debye cones the intersection points for all cones produce a circular configuration of increased intensity which form a closing ring around the hotspot 28. In FIG. 2*c* there is a similar closing ring of intersection points 48. These closing rings represent a region of increased intensity but still significantly less than at the centre 28 in FIG. 2*b*.

Figure 3:
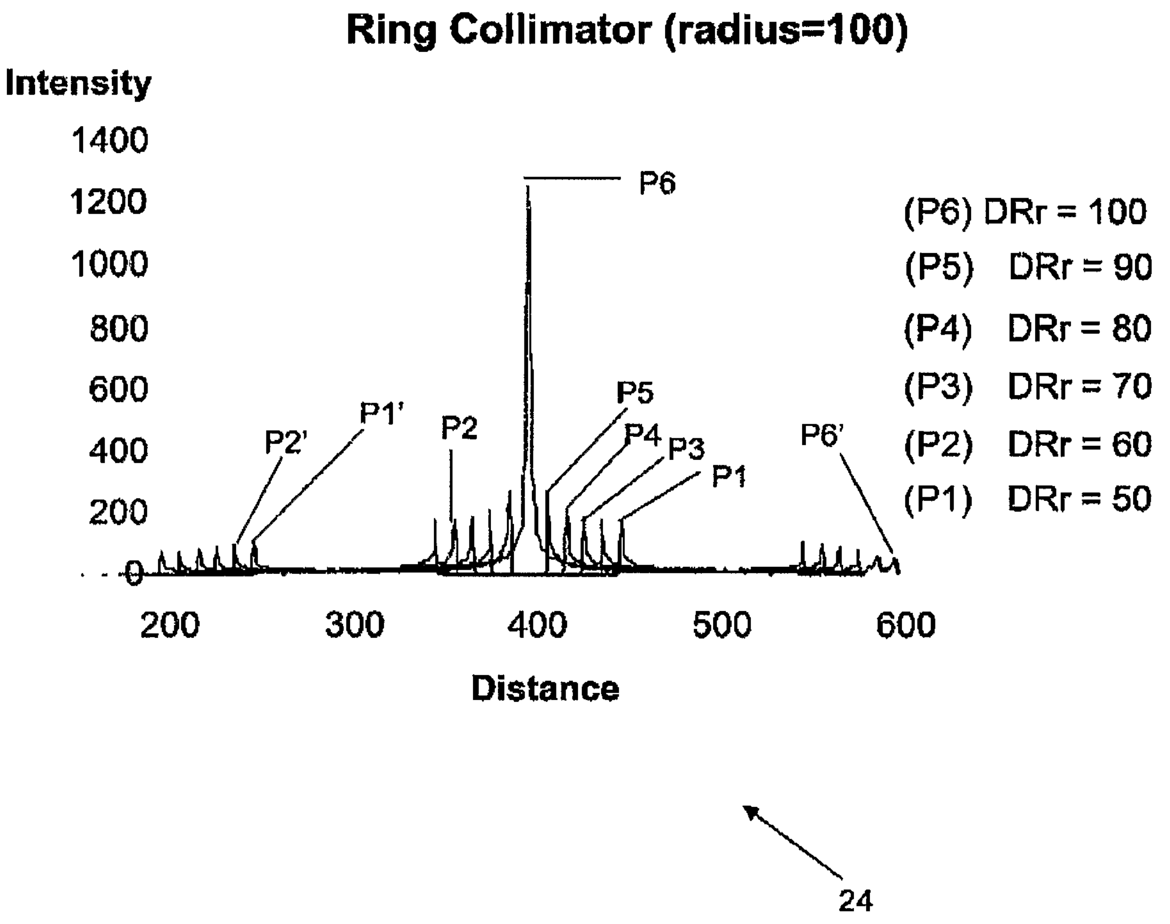

In FIG. 3 is shown the intensity in the central region of the detector surface 18 for different radii of circular cross sections of Debye cones (similar results would be present for elliptical crossections). FIG. 3 illustrates the situation where the circular target path 26 has a radius of 100. Peak P1 represents the intensity of X-ray radiation found at the detection surface 18 from the closing ring from a Debye ring radius of 50. Peak P1' represents the intensity of X-ray radiation found at the detection surface 18 from a further ring from a Debye ring radius of 50 formed by the closing ring. The intensity at both P1 and P1' is low with it being slightly higher at P1' closer to the centre where the radius is smaller and therefore concentration of intersections of cones is greater. Peaks P2 and P2' represent intensity rings from a Debye cone radius of 60 and as well as being more spaced there is a slightly higher intensity in the peaks. As the Debye radius increases to 70, 80 and 90 as seen from the respective peaks illustrated by P3 and P4 and P5 each time the peaks get slightly further away and very slightly increase the intensity. However when the Debye ring radius is 100 then P6 and P6' are generated. Whilst P6' which is now 200 away from the centre isn't of great intensity, P6 which is coincident with a hotspot 28 has a much greater intensity level than all of the other peaks. Accordingly, at this point far more radiation can be measured and the sensor need only be small if positioned at the hotspot 28.

Figure 4:
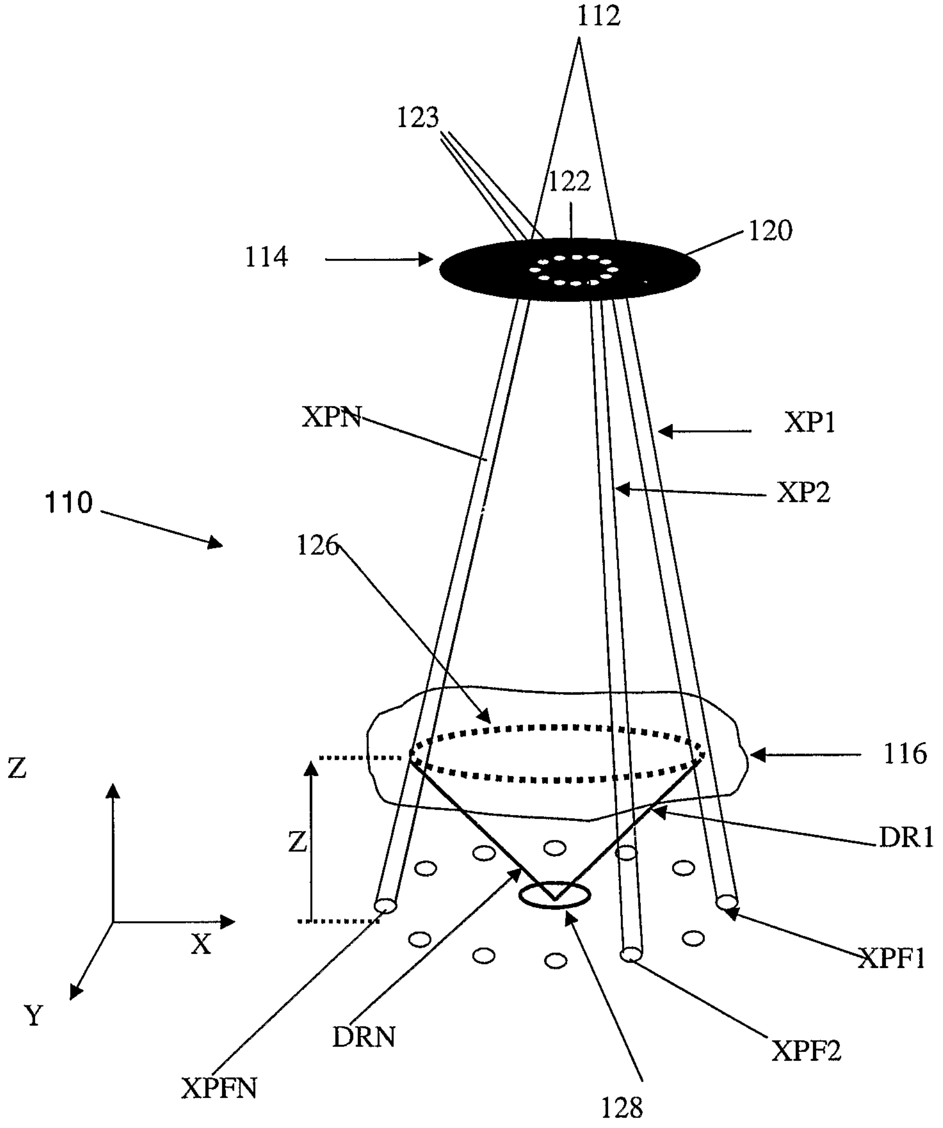

In FIG. 4 is shown a second embodiment of X-ray scatter gathering apparatus 110. Features which are substantially similar to or have substantially similar functions to features in embodiment 10 are given the same reference number but preceded by a 1. The principal difference between apparatus 110 and apparatus 10 is the ring collimator 114. Instead of the solid annulus 120 and disc 122 being separated by a single annular aperture they are separated by numerous circular apertures 123 (which may alternatively be another curved or polygonal shape) in an annular pattern. As a result of this the X-rays X are collimated into multiple beams of primary X-rays XP1, XP2 XPN. These beams are still in a conical configuration so they hit target object 116 in a similar circular path as with apparatus 10 except they hit discreet points by the beams XP1 to XPN representing each of the apertures 123. This results in a ring of multiple X-ray beam footprints XPF1, XPF2 to XPFN and still results in a hotspot 128 when distance Z is correctly set since each of the Debye rings DR1 to DRN from each of the X-ray beams XP1, XP2 etc coincide. Since the X-rays only hit the object 116 at discreet points rather than continuously all around the circle the intensity at the hotspot will be slightly lower than for embodiment 10 but provided there are sufficient numbers of apertures 123 the drop in intensity will not be too significant.

With this and other embodiments only the parts of Debye cones DR incident on the hotspot are illustrated.

Collimator 114 does have a constructional advantage over collimator 14 in that no additional measures are required to keep the disc 122 in its correct relative position to annulus 120 since they are connected and may form part of the same piece of material.

Figure 5:
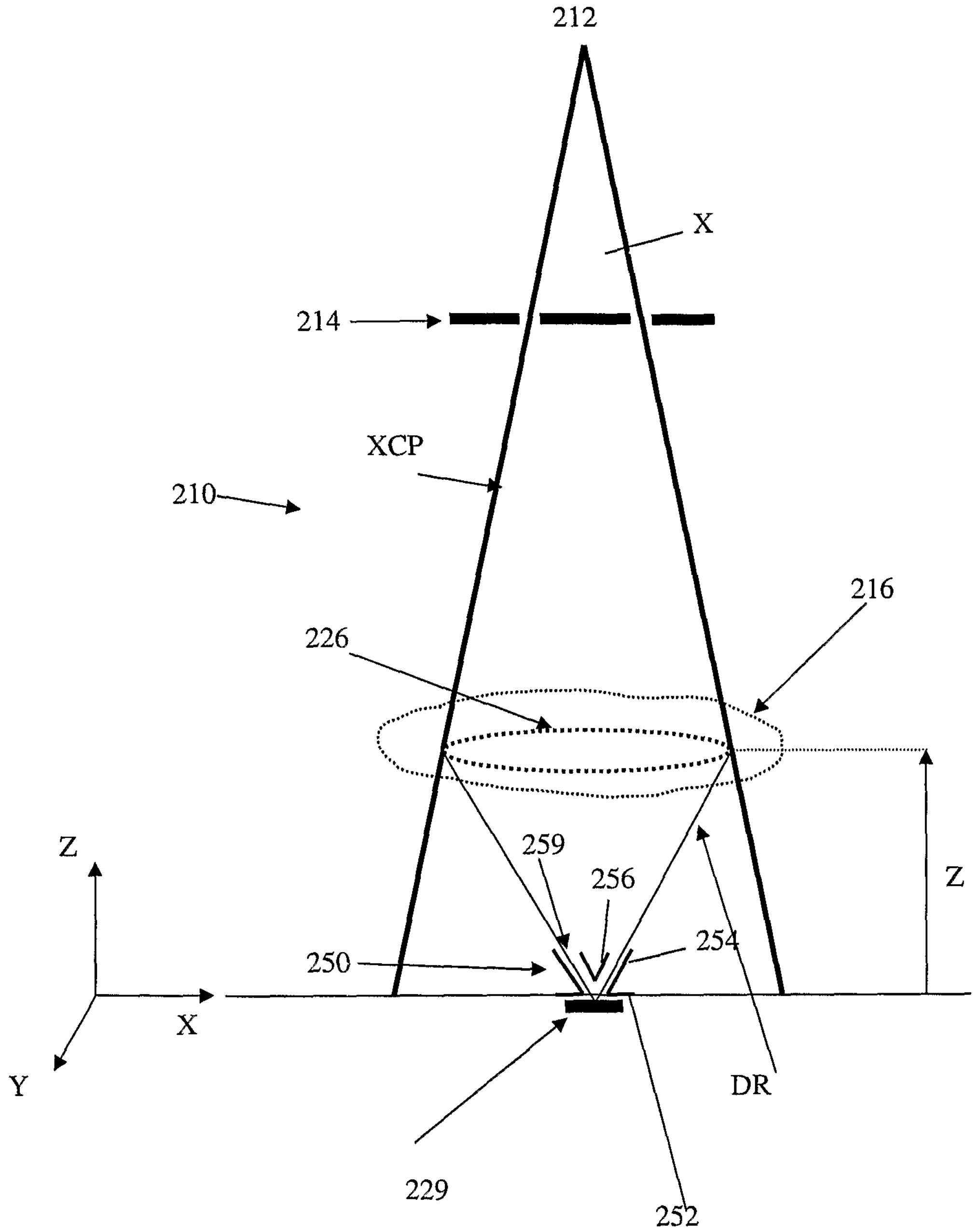

In FIG. 5 is shown a third embodiment of X-ray apparatus 210. Features which are substantially similar to or have substantially similar functions to, features in embodiment 10 are given the same reference number but preceded by a 2. This embodiment's principal difference is at the detection surface 218 where there is only a single sensor 229 depicted in the centre coincident with hotspot 228. Additionally there is a sensor collimator 250 positioned only slightly above the detection surface 218. This collimator 250 comprises a first small cone 256, a larger diameter cone 254 and side portions 252 all made of a suitable material for blocking X-rays. The cones are configured so that the smaller one 256 is inside the larger 254 providing a channel between them in the shape of a tubular cone 259. The circular collimator is made of suitable material such as the same material as the ring collimator 214 therefore preventing X-rays hitting the sensor 229 except via the channel 259 The cones have a vertical cross section which is V shaped as shown in FIG. 5. The angle of these 'V's and of the cones is chosen to focus at a range Z from the surface 218 along the conical curtain XCP which coincides with the target annulus 226. The collimator 250 acts to block X-rays from hitting the sensor 229 that are not parallel with and coincident with the tubular cone 259.

This embodiment is useful where the target object 216 is not in a convenient substantially planar form. As soon as the target object has a significant depth there will be scatter occurring throughout its depth. Accordingly further Debye cones will be produced going through the depth of the target object 16 which could produce cones which fall on the detector 229 confusing the analysis. Accordingly the sensor collimator 250 helps cut out Debye cones originating from any point other than distance Z. Additionally it will help to cut out any Debye cones caused by other materials. If the object contains the main desired material which is aimed to identify but also another polycrystalline material there can be a second set of Debye cones from the second material at a different angle. These should also be cut out by the sensor collimator 250.

Figure 6:
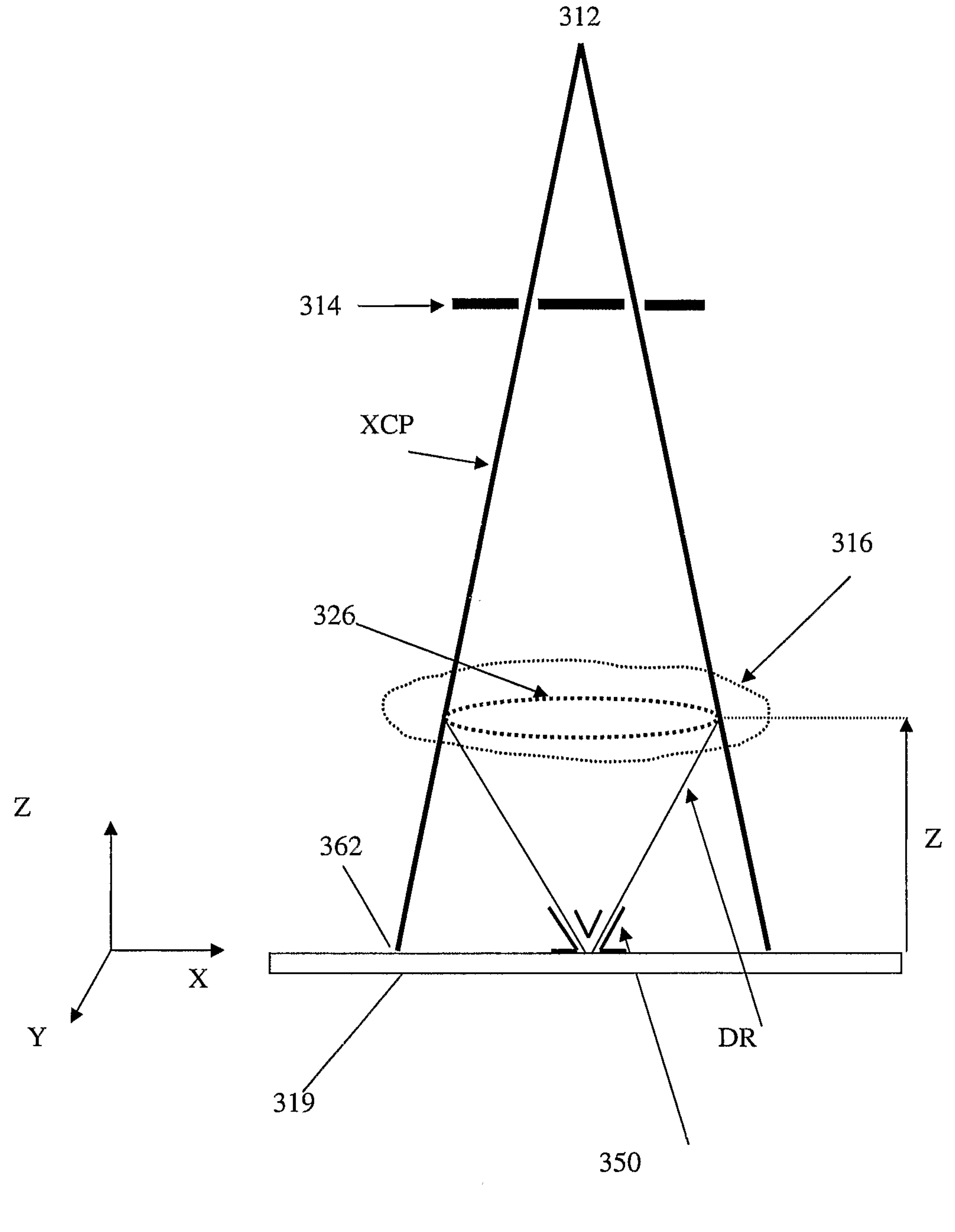

In FIG. 6 is shown a fourth embodiment of X-ray apparatus 310. Features which are substantially similar to or have substantially similar functions to features in embodiment 10 are given the same reference number but preceded by a 3. The principal difference between apparatus 310 and apparatus 210 is that instead of a single sensor 229 only by the hotspot 228 there is a large spatially sampling or analogue imager 319 extending over a much greater area of the possible detection surface 318 and beyond the expected circular annulus generated by the primary X-ray beam XPC. This allows for further analysis other than just looking at the intensity detected at the hotspot 328. In particular it allows for any analysis such as conventional analysis to be done on the primary beam at 362. Although the analysis of an annular pattern is not conventional. In this example it has a sensor collimator 350 using apparatus 210 but alternatively it can be used without.

Figure 7:
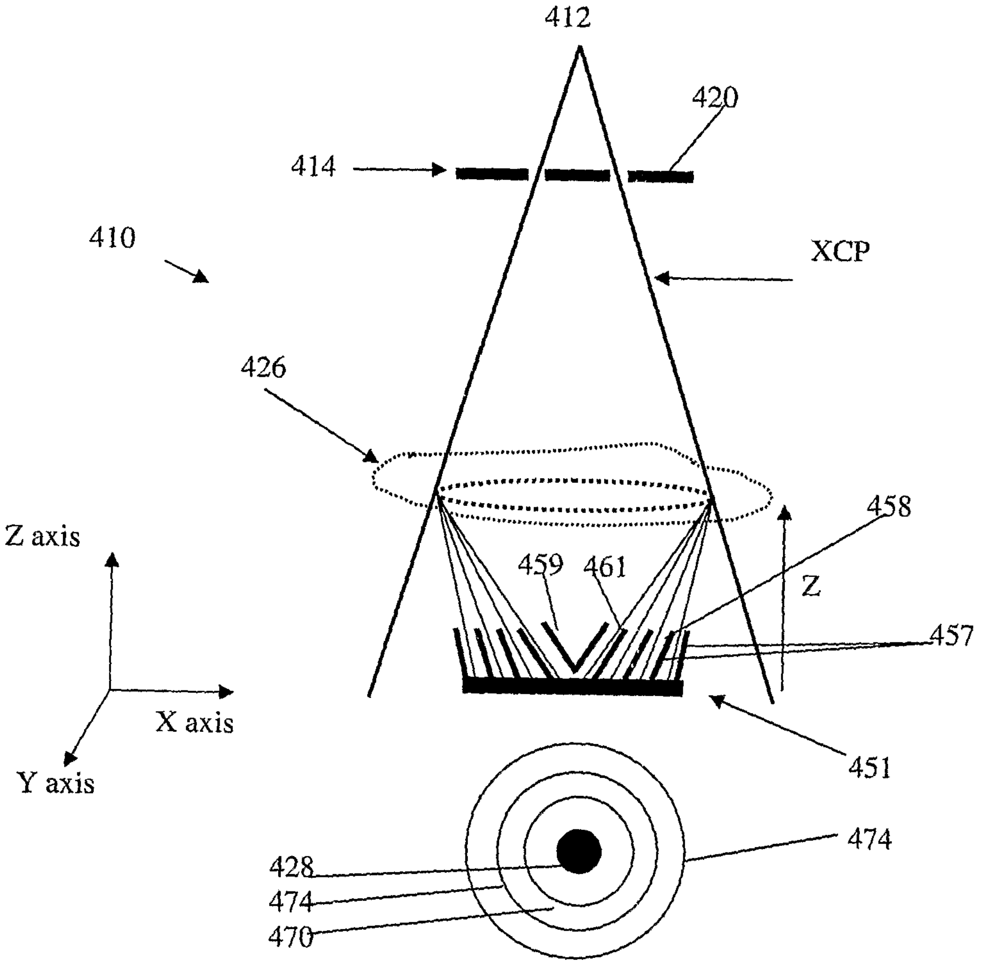

In FIG. 7 is shown a fifth embodiment of X-ray apparatus 410. Features which are substantially similar to or have substantially similar functions to features in embodiment 10 are given the same reference number but preceded by a 4.

Apparatus 410 comprises a collimator/detector 451 which comprises a series of cones 457 of increasing diameter and decreasing angle with channel 458 between the neighboring cones 457. Collimator/detector 451 also comprises circular sensors 474 located at the bottom of each channel 458 in between each of the cones 457.

Each cone 457 is configured to focus at a distance Z from the detection surface (the 'cone sections' 457 have an apex (or focus) below the sensor ie in the opposite direction along the Z-axis therefore we cant say the cones are focused at a distance Z) 418 as with sensor collimator 250 but each of the separate cones 457 is configured to collect scattered radiation at different angles corresponding to different Debye cones. Only Debye cones collected by the most central channel between central cones 459 and 461 will result in a hotspot 428 with great intensity but the annular detectors in each of the subsequent channels will still detect radiation from Debye cones and preferably are configured to detect a "closing ring" of Debye cone intersections.

Apparatus 410 can be used when it is primarily intended to identify and quantify a particular polycrystalline material within the target object 426 but it is useful to also analyze other scattering angles produced by the particular material and/or any different polycrystalline materials with different Debye cone scatter that are present. Whilst intensity of these further scattering angles and/or materials at the detector will be less it may be enough to for example attempt to detect them in greater detail by using the separate X-ray apparatus or by changing the distance Z to so that the Debye cones from the second angle/material which is now wished to be identified coincides with the channel defined by cones 459 and 461.

Figure 8:
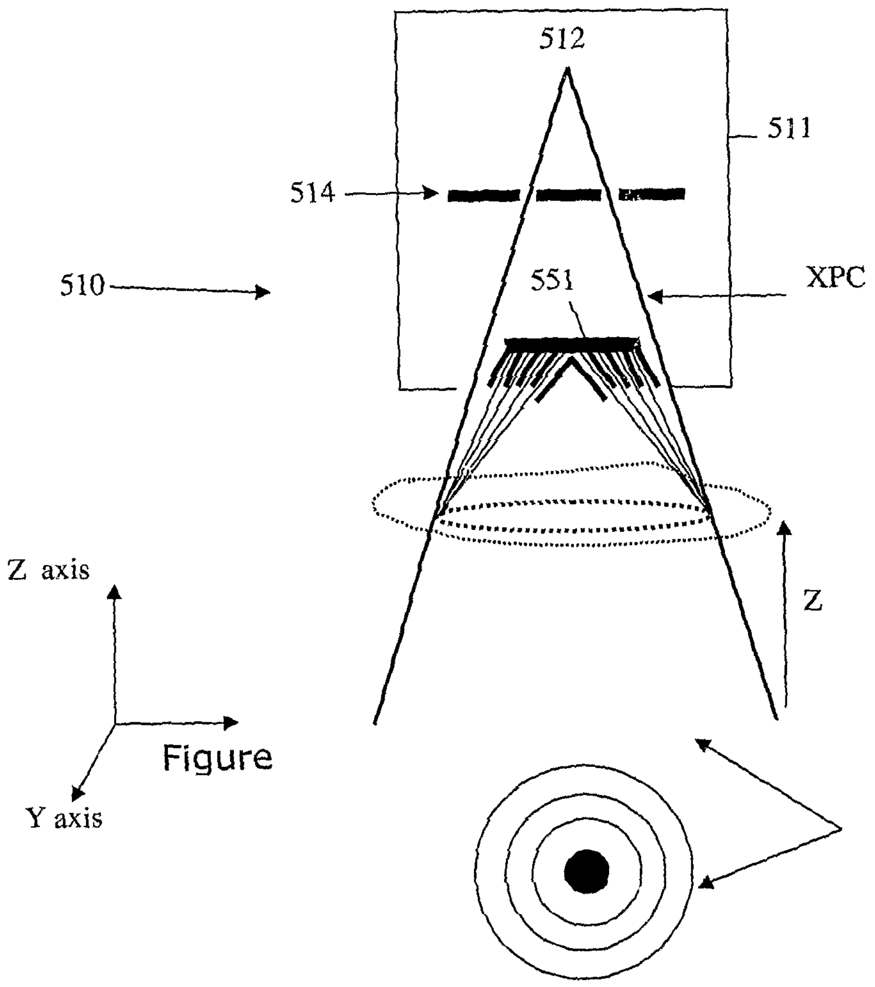

In FIG. 8 is shown a sixth embodiment X-ray apparatus 510. Features which are substantially similar to or have substantially similar functions to features in embodiment 10 are given the same reference number but preceded by a 5. Apparatus 510 is substantively similar to embodiment 410 except that the collimator/detector 551 whilst similar to collimator detector 451 is positioned along with detection surface 518 between the X-ray source 512 and the sample 516 rather than on the far side. Since Debye cones will be both scattered forward and backward it still allows for accurate identification of polycrystalline material.

Apparatus 510 also includes a housing 511 which surrounds the X-ray source itself, the ring collimator 514 and the X-ray detector/collimator 551. Accordingly all component parts of the apparatus 510 except for the target object 516 itself are present within the housing 511. This embodiment is particularly convenient as it may require only limited setting up in situ with all the apparatus except the object 516 provided all within one housing so that only the distance to the object 516 will have to be set correctly. Accordingly this is useful in placing the apparatus within an X-ray machine in an airport or for the inspection of objects which might only be be accessed from one side such as abandoned luggage for example. It also has the advantage that no apparatus needs to be placed behind the sample. This allows for it to be used with very large samples for which it might be impractical to put a detector behind it. Indeed in some examples the sample may be too large to be accommodated by forward scattering embodiments such as 410 as the separation between the ring collimator and the sample annulus is too small to be practical.

Figure 9:
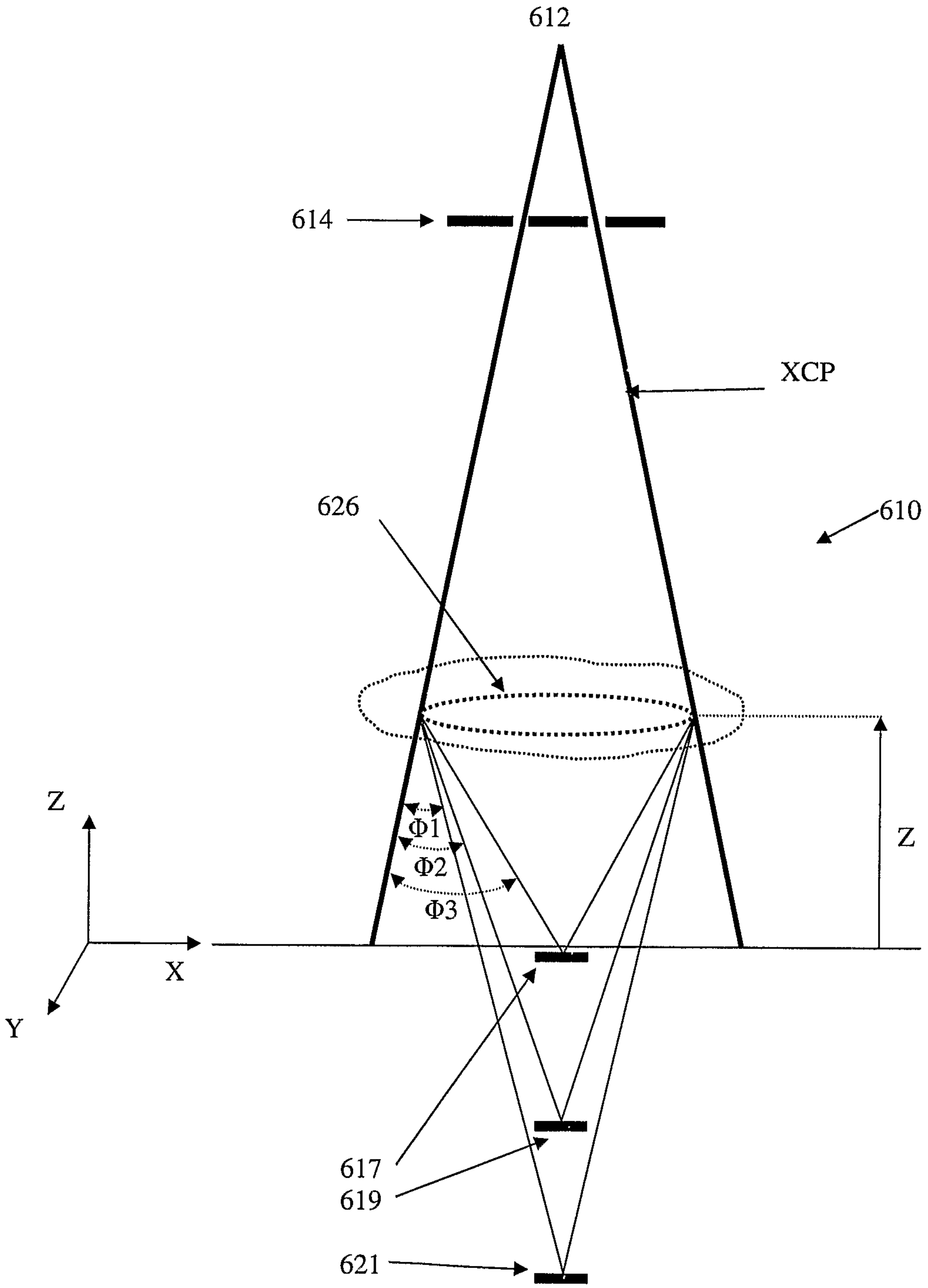

In FIG. 9 there is shown a seventh embodiment of X-ray apparatus 610. Features which are substantially similar to or have substantially similar functions to features in embodiment 10 are given the same reference number but preceded by a 6. One difference from apparatus 10 is that there is no physical detection surface 18 but a hypothetical detection plane. The first sensor 617 is present by the hotspot 628 of the plane 618. Additionally there is a second sensor 619, and a third sensor 621 both in line with the first sensor 617 and with the centre of the ring collimator 614 but at considerable greater distance than Z from the target annulus 626.

Embodiment 610 can be used when there are multiple polycrystalline materials in the sample object which produce Debye cones of different angles $\phi$1, $\phi$2 and $\phi$3 or when the single polycrystalline material produces cones at those angels. Accordingly this allows for the greater intensity at a hotspot to be detected for multiple materials or for increased specificity for a single material.

Figure 10:
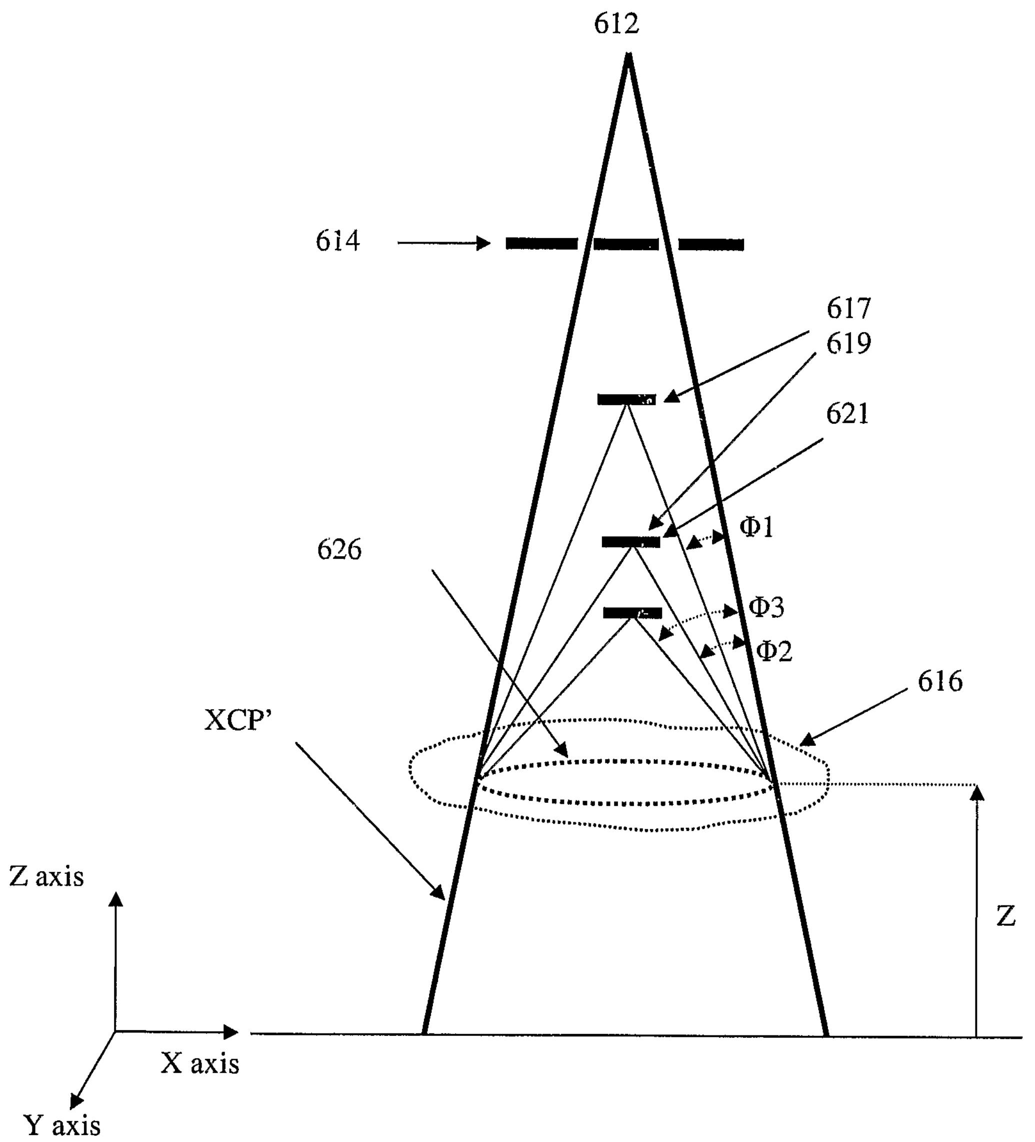

In FIG. 10 is shown an apparatus which is substantially identical to apparatus 610 but with the sensors 617, 619 and 621 positioned between the sample 616 and ring collimator 614 to detect back scatter. As with apparatus 510 a housing can be provided which surrounds the X-ray source, ring collimator and all of the sensors. Additionally the housing could merely cover the ring collimator and sensors with the X-ray source being provided externally.

Figure 11:
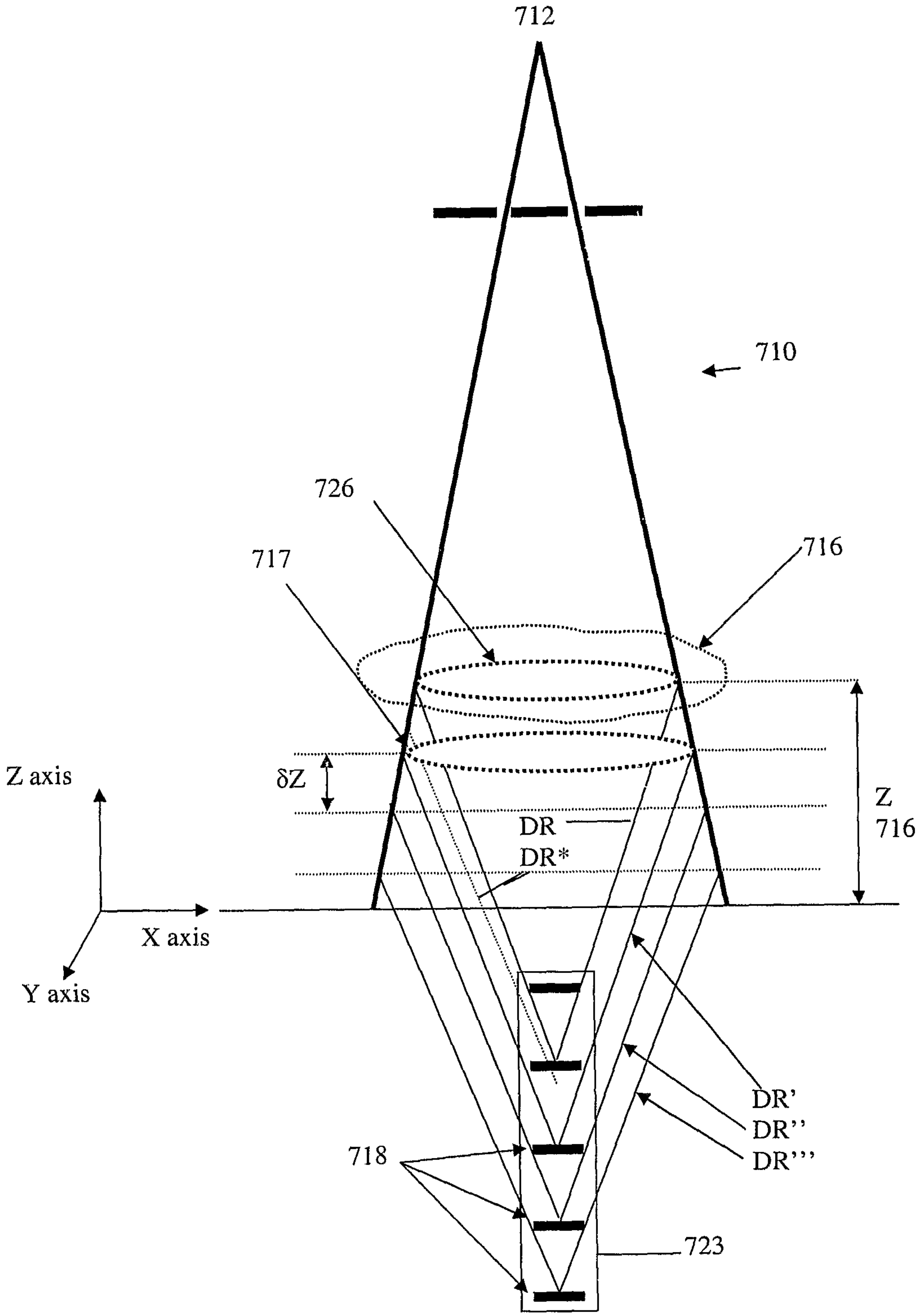

In FIG. 11 is shown an eighth embodiment of X-ray apparatus 710. Features which are substantially similar to or have substantially similar functions to features in embodiment 10 are given the same reference number but preceded by a 7.

Apparatus 710 similar to in apparatus 610 but comprises a housing 723 surrounding five detectors 718. Instead of being designed for a target objects which contain multiple materials it is designed analyze one polycrystalline material but for a target object 716 with considerable depth or provide accurate height position information for a target object which has a depth less than the distance between sensors 718 ($\delta Z$) or the separation in the line of sight of adjacent sensors at the primary X-ray beam in the Z axis. It may be possible to compute the depth or Z axis component of an object which subtends a number of $\delta Z$ separations. Debye cones are generated through the depth of the object 716 with certain Debye cones DR1, DR1', DR" and DR'" 1 depicted for discrete increases in depth delta Z through the sample.

For the same material the Debye cones rays are the same but from different target circular paths 716, 717 at different depths. As well as a different set of Debye cones each target path generates a hotspot of great radiation intensity at a distance Z. Accordingly each detector 718 is placed at the appropriate distance to measure a hotspot.

Each of the sensors 718 can act as a partial collimator for the detectors immediately below it preventing X-ray radiation which is occluded by a sensor positioned closer to the X-ray source from hitting the lower detector 718. For example radiation form cone DR* is blocked by a sensor 718 from hitting the sensor directly below it especially if the sensor incorporates an X-ray attenuating material on its reverse side.

Figure 12:
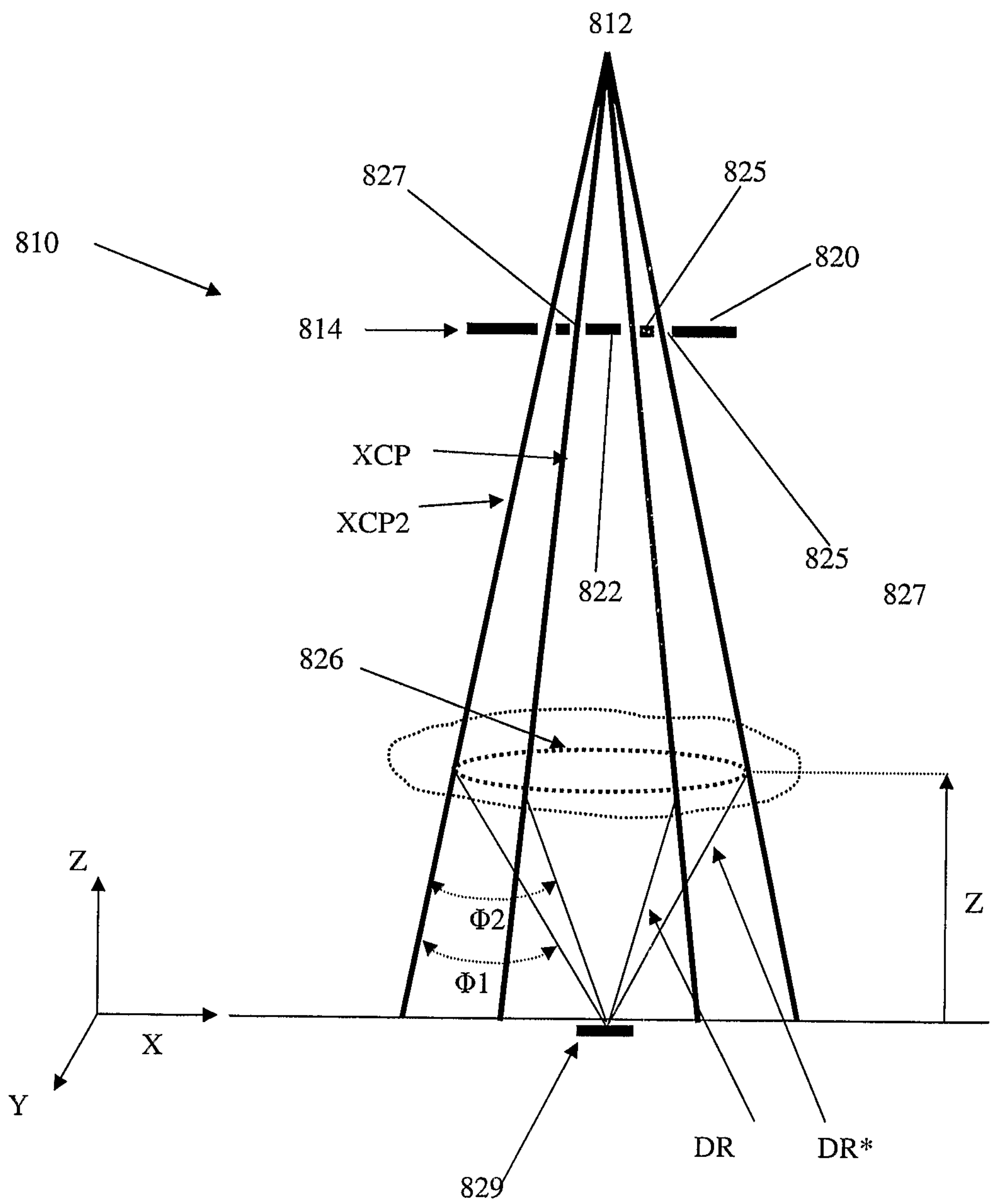

In FIG. 12 is shown a ninth embodiment of apparatus 810. Features which are substantially similar to or have substantially similar functions to features in embodiment 10 are given the same reference number but preceded by an 8.

Apparatus 810 is useful and when looking increased specificity in the signal related to a particular material which produces more than one scattering angle. In this case rather than use different sensors a different ring collimator 814 is used. Ring collimator 814 has in addition to disc 822 and a first annulus 820, has a second annulus 825 in between them and therefore two annular apertures 824 and 826. This bi-ring collimator 814 produces two conical curtains of X-rays XCP and XCP2 from X-ray cone X. These produce a smaller and larger radius circular target path 826 and 827 at object sample 816 producing Debye cones parts of which are illustrated as DR and DR* respectively.

The distances can be correctly set so that the situation of FIG. 2*b* occurs for both sets if the Debye cones originate from a plane at depth Z. The detector 829 is located in this place the hotspots created from the overlap of DR and DR* caused by both of these cones for two different scattering angles are superimposed.

Figure 13:
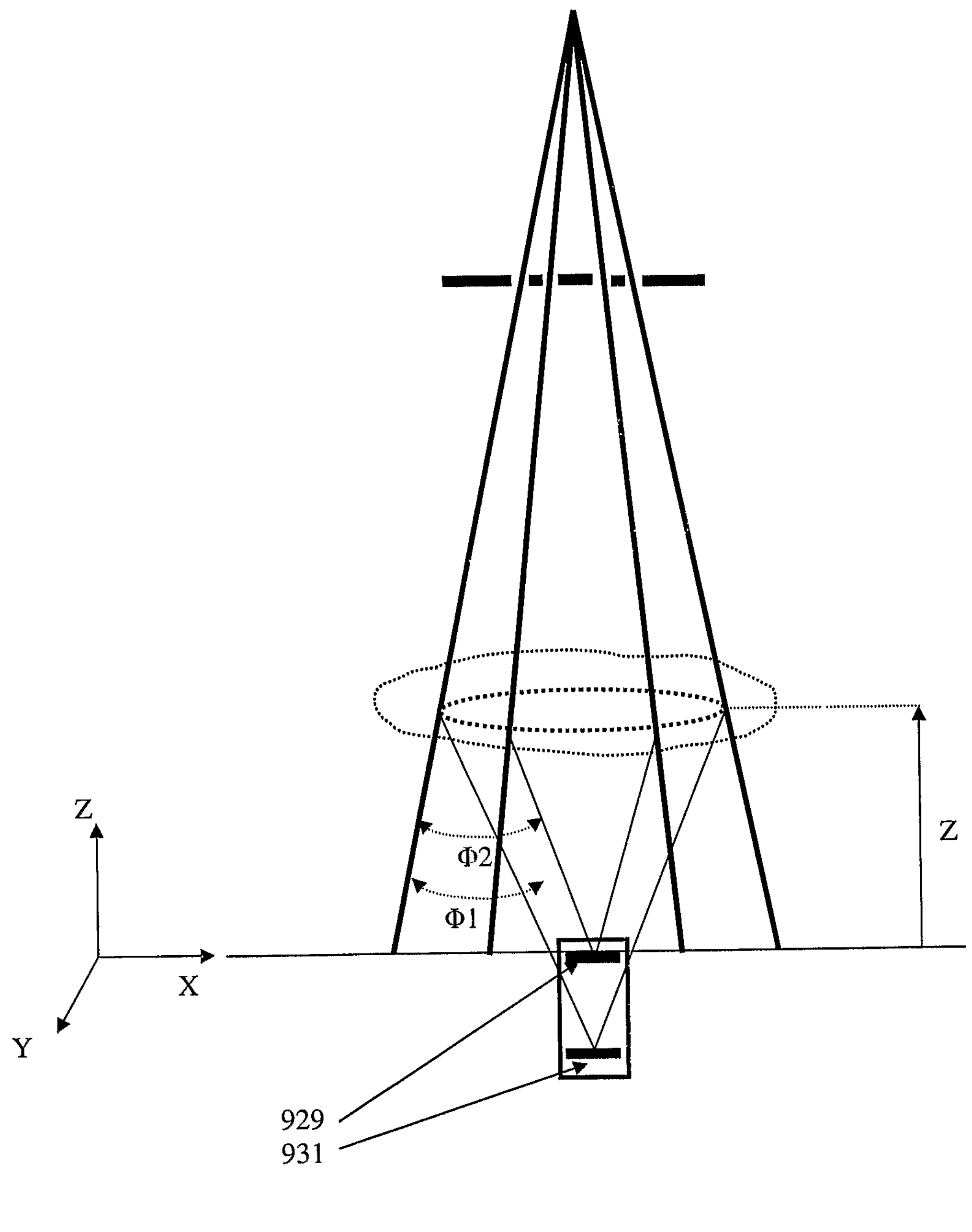

In FIG. 13 is shown a slightly altered form of apparatus 810 where rather than the distance being configured so that the two different materials produce Debye cones which coincide at the same hotspot they coincide in two different planes with two separate detectors 929 and 931 to detect these two hotspots. Beneficially the higher detector 929 blocks scattered radiation from the first material hitting the second sensor.

Figure 14:
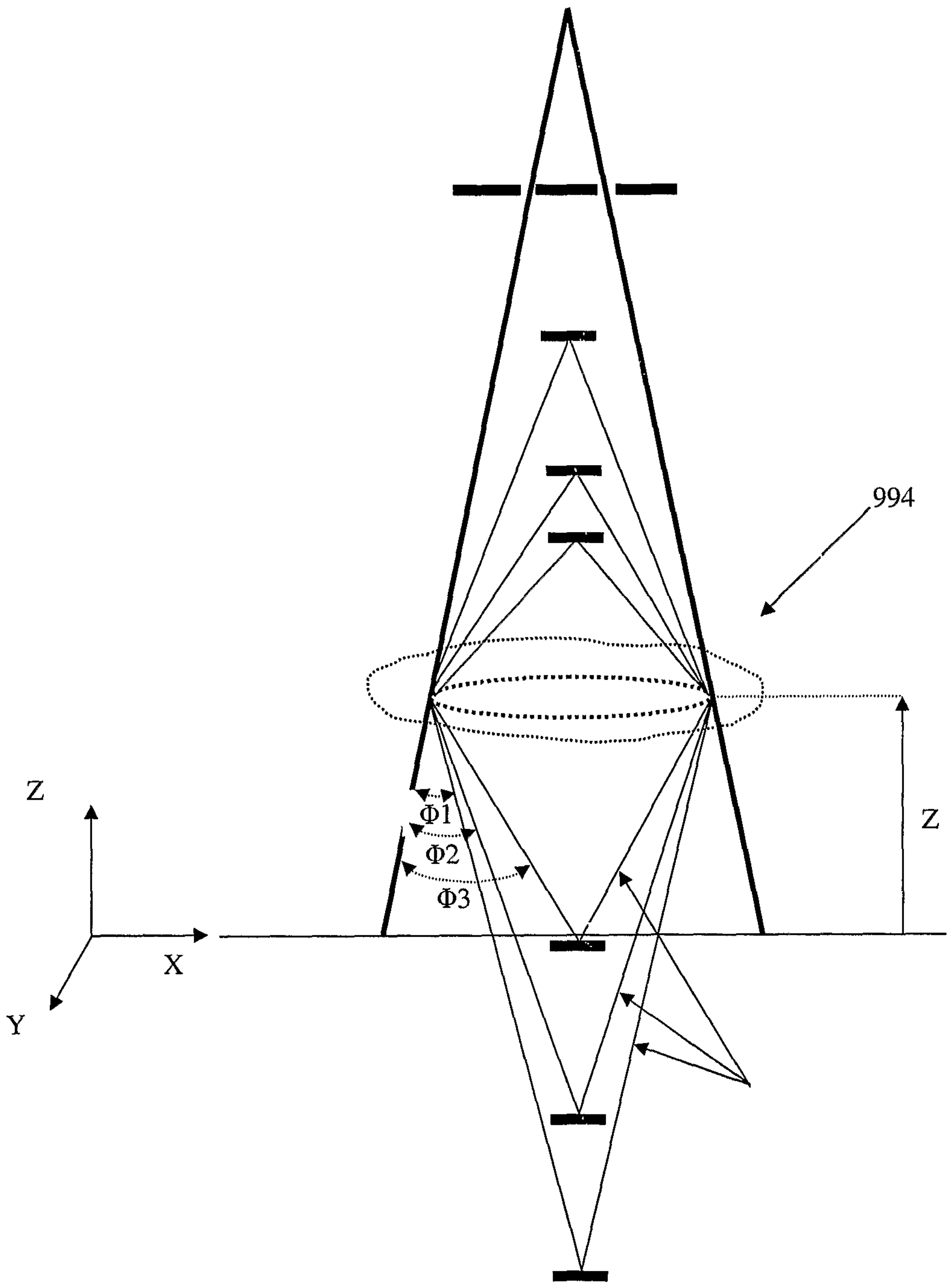

FIG. 14 shows a further alternative apparatus 994 substantially similar to apparatus 610 but with the further sensors of apparatus 690 (where is 690?). This embodiment allows for more X-ray radiation to be gathered.

Figure 15:
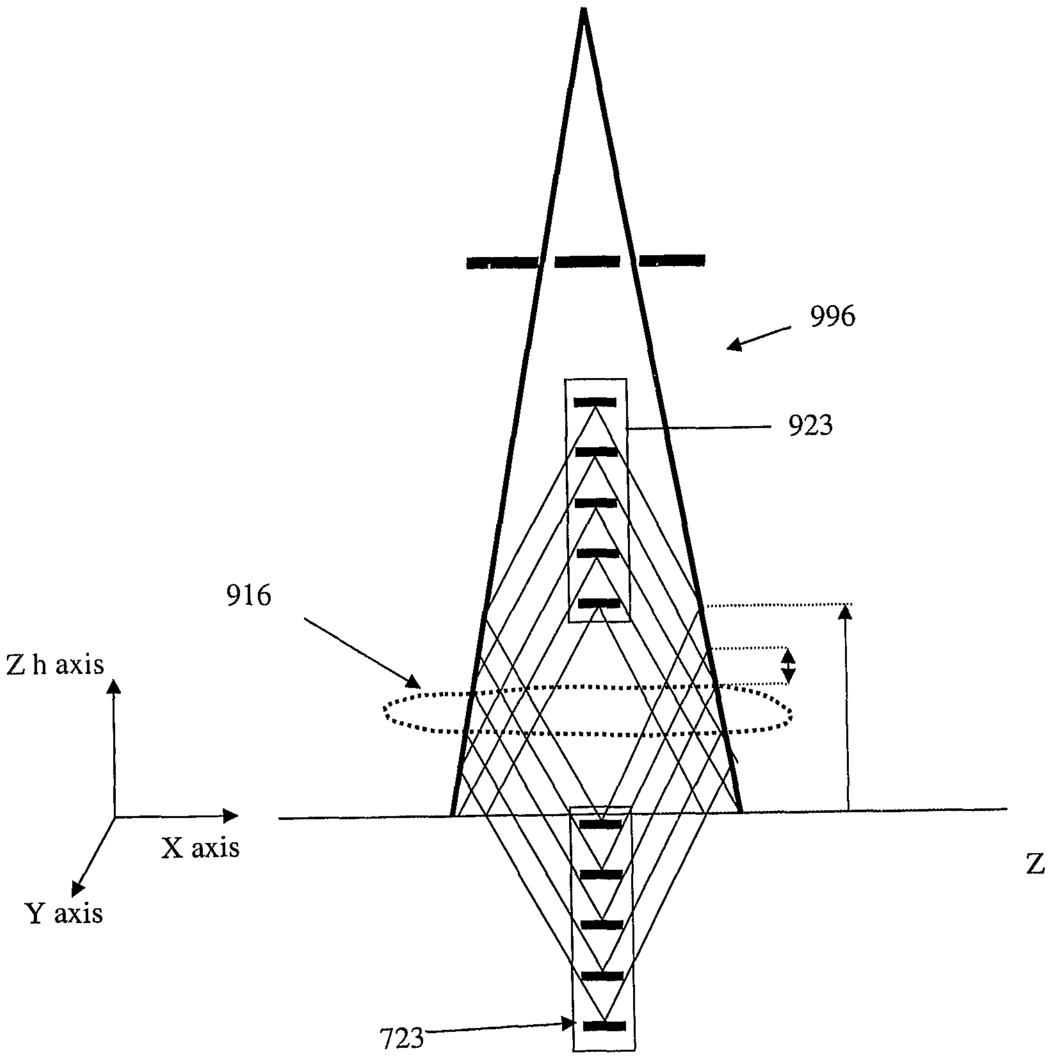

In FIG. 15 is shown apparatus 996 which is substantially similar to apparatus 710 but has a further housing 923 with sensors repeated substantially similar to housing 723 but positioned on the opposite side of the target object 916 to detect back scatter.

Figure 16:
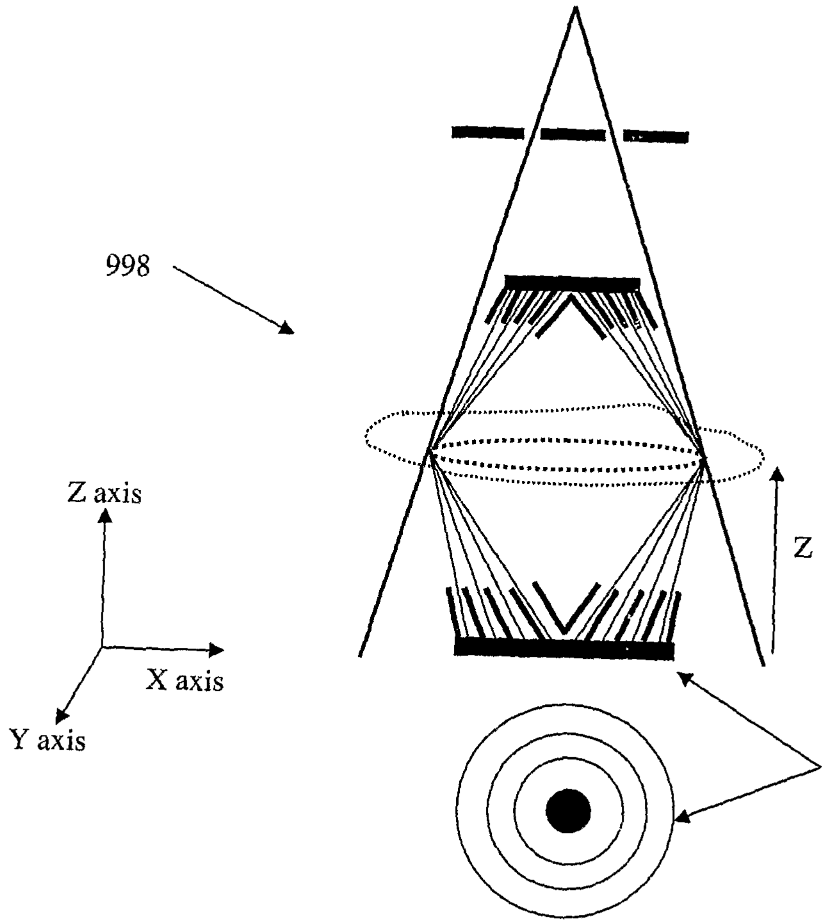

In FIG. 16 is depicted an embodiment having both collimator/detector 451 and collimator 551 for detecting back scatter.

Placing detectors, sensors and/or detecting surfaces on both sides of the object can be done with any of the described embodiments.

In FIG. 17*a* is shown an alternative ring collimator 15 for use with apparatus 10 instead of ring collimator 14, or with any of the other embodiments which have a single aperture. Collimator 15 is more elongate than collimator 14 and the aperture 27 is an elongate cylinder. Collimator 15 can be made of a less attenuating material since its extra length will serve to block more X-rays and also provides improved collimation due to its extended length allowing the collimated beam XCP to be reduced in width and divergence. Additionally the collimated X-rays may be closer to a circular cylindrical curtain than a conical curtain. So long as the target path produced is substantially circular the invention will work in the same way. Non-circular paths will still increase intensity but the further they are form a circle the less the potential intensity. Shapes which tessellate a plane (e.g. hexagon, square) may be used to produce multiple hot spots.

As an alternative to a small X ray source collimator 15 may be used with a source which moves in a circular path tracing the shape of the aperture 27. This results in a circular cylindrical curtain with minimal divergence.

In FIG. 17*b* is shown an alternative bi-ring collimator 815 which is similar to collimator 515 but has two cylindrical apertures and could be used instead of collimator 814.

In FIG. 17*c* is shown an alternative collimator which has discrete apertures like collimator 214 but has three sets of annular configurations allowing for three hotpots to be created for different materials. Multiple annuli collimators can be created to measure multiple materials.

Preferably the apertures of the ring collimators are either focused at the X-ray source (creating a conical curtain) or parallel with it (creating a cylindrical curtain). Annular apertures and multiple apertures in annular configurations may be combined in multiple annuli collimators. Provided the discrete apertures are in annular configurations their individual shape is unimportant. Diameter and or pitch of discrete or annular apertures in multiple annuli collimators can be used to weight the contributions from different cones. Right circular cones, oblique circular cones and elliptical right cones, oblique elliptical cones may be utilized.

Multiple collimators can be used in combination. Stacking many multiple annuli collimators with discrete apertures similar to collimator 215 anti-phase with each other allows for a collimating device to be built whereby the collimators can be rotated relative to each other so that only one annulus of apertures is in phase and the others out of phase to select a particular ring or rings of holes. This can allow the same collimator to be used for multiple materials without large adjustment of the distance between the sample and sensor Z.

Figure 18A:
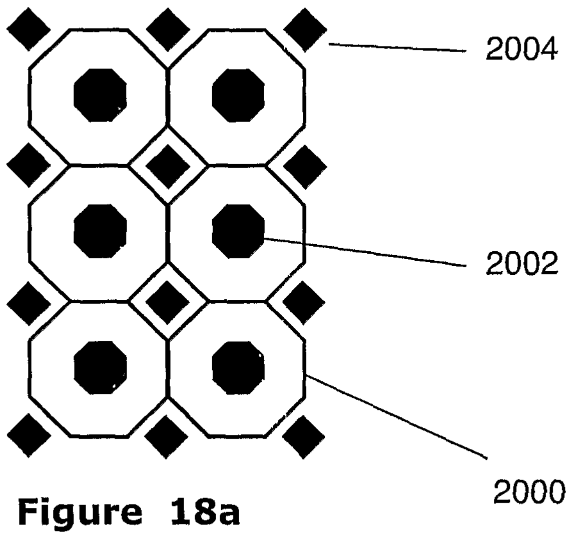
Figure 18B:
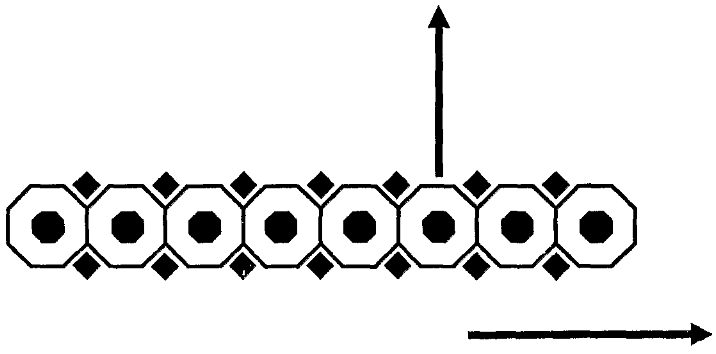
Figure 19A:
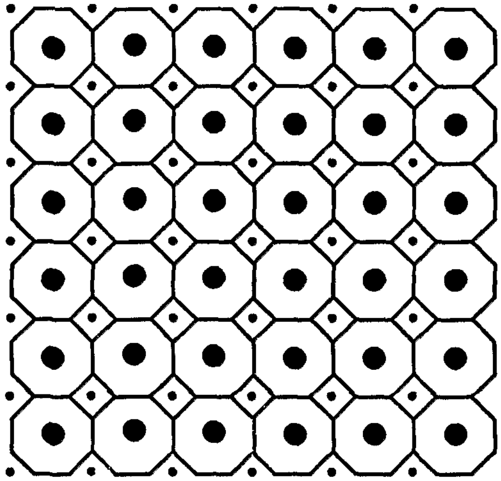
Figure 19B:
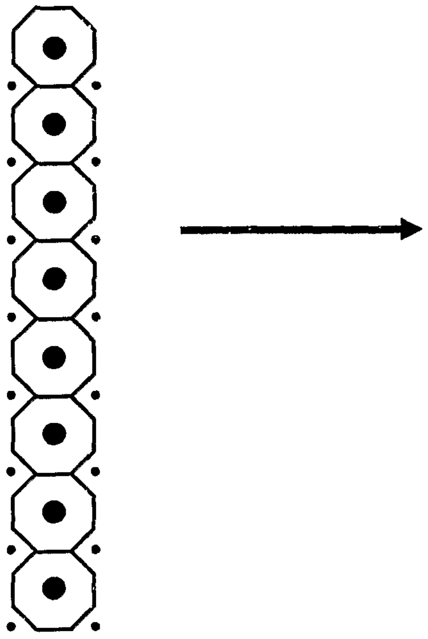
Figure 20A:
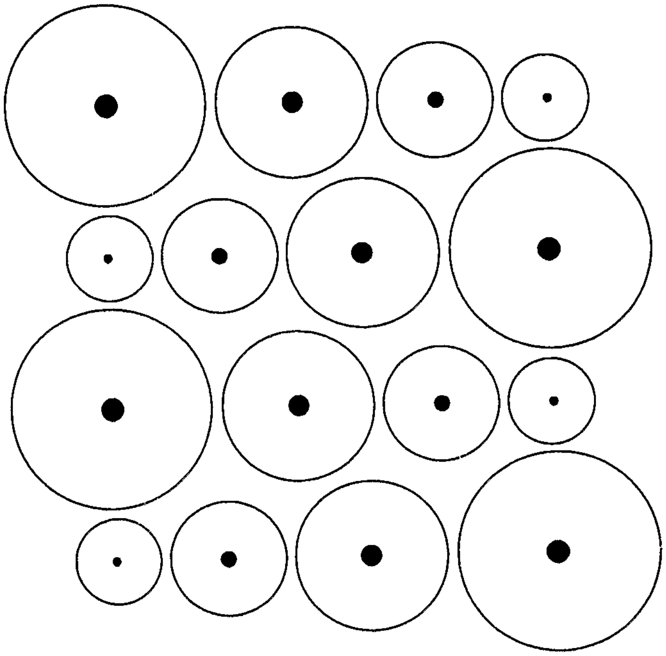
Figure 20B:
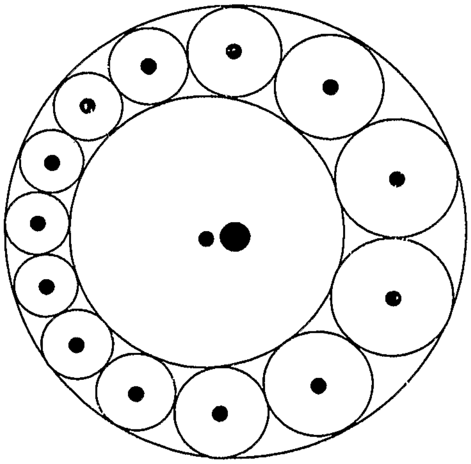
Figure 21:
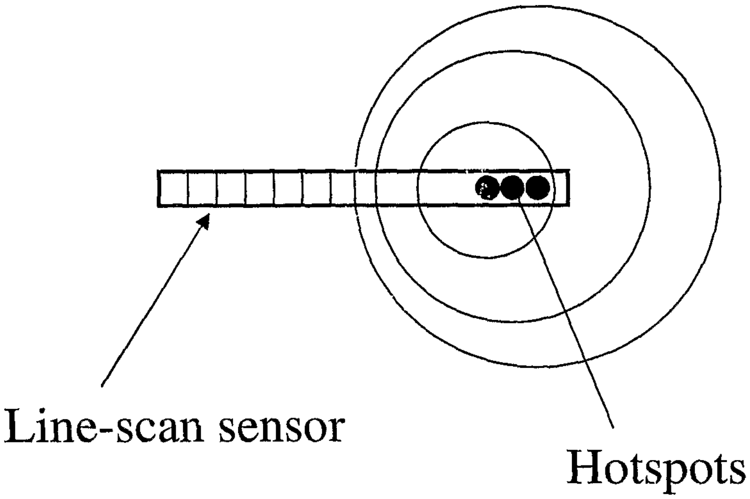

All the apparatuses, FIG. 1 through to FIG. 16, can be employed as a material discriminating or identifying element in a system which utilizes a single element or many elements to scan a large object volume. In FIG. 18*a*. is an area array and a linear array of apparatuses. The apparatus in FIG. 18*a* represents a tuned set of elements which are designed to tessellate a plane. Each octagon 2000 represents the footprint of a primary X-ray beam each inner octagon 2002 represents a sensor and each square 2004 represents a sensor. The elements may be organized into an area array as in FIG. 18*a* or a linear array as in FIG. 18*b*. The direction of the relative motion of the array with respect to the object under inspection is determined by whether a perspective view: is required or a tomogram or laminagram. The polygonal X-ray beam footprint may be combined with round sensors as in FIG. 19*a*. Other non tessellating X-ray beam footprints and sensors may be used to sample a volume as in FIG. 20*a*. A continuous chain of circular X-ray beams is contained within two other larger circular X-ray beam footprints in FIG. 20*b*. The centres of the two larger circles produce correspondingly offset hotspots. A line-scan sensor or position sensitive sensor may be used to sample simultaneously the intensity of more than one hotspot as shown in FIG. 21.

Figure 22A:
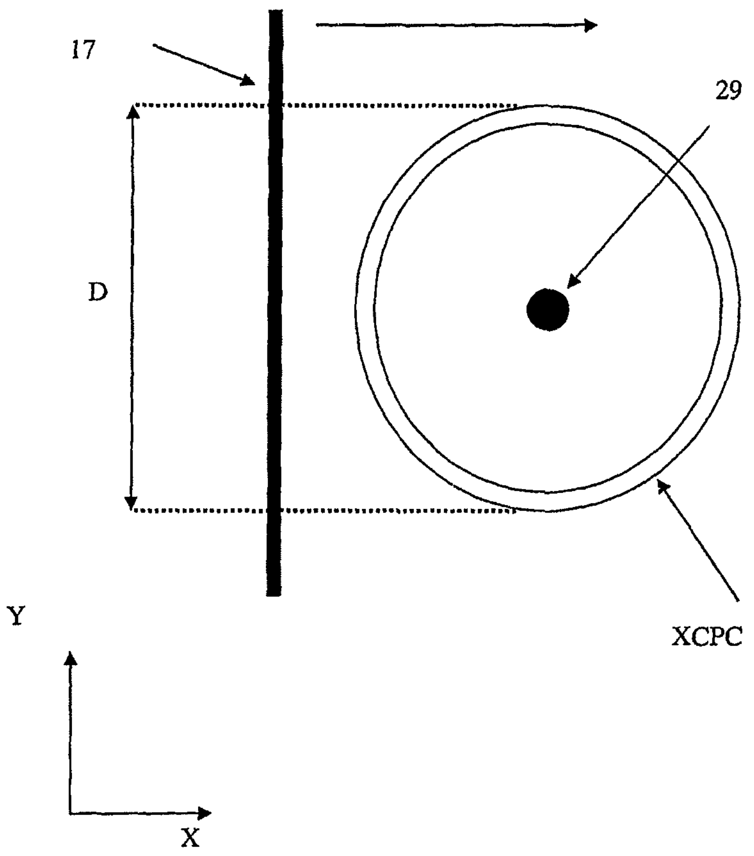
Figure 22B:
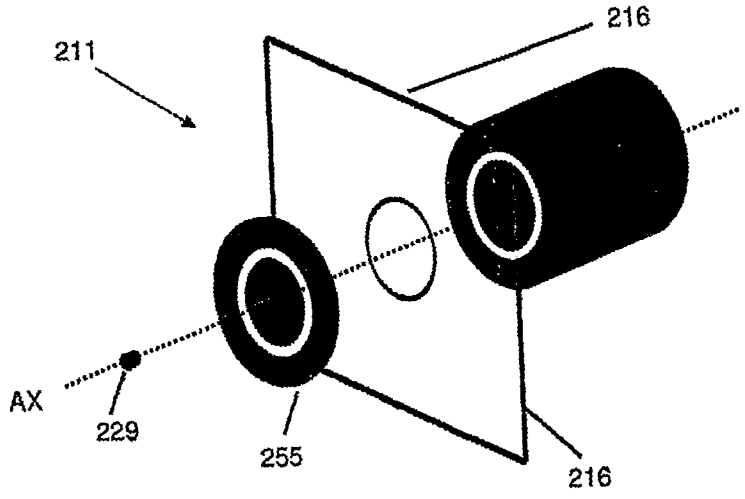

In FIG. 22 is shown use of the apparatus 10 for a linear object 17 rather than a plate like object 16.

The width of the object 17 under inspection is less than the diameter of the conical curtain of X-rays XCP and the length is greater. So the sample 17 is translated through the curtain XCPC. The hotspot sensor 29 receives diffracted X-rays from different portions of the object 17 during the translation through the curtain XCP. Further, sensor 29 receives diffracted X-rays from different parts of any Debye cone with a diameter equal to that of the XCP. Thus an integration of all parts of the Debye cone is achieved. With the appropriate equipment such as a computer attached to sensor 29 an integrated signal can be produced for a linear portion of the sample 17 equal in length to the diameter of the conical beam XCP. This technique has the advantage that when two discrete parts of the sample are in the primary beam path XCP the intensity of the diffracted X-rays is doubled at the hotspot 28.

The relative widths of the sample 17 and the curtain of primary X-rays produce a significant change in intensity profile at the start (and end of scan). A full integration can be achieved once the linear sample 17 bisects the conical primary beam. This integration procedure can be done with any of the described embodiments.

In some instances, due to symmetrical material properties of the sample, the sample may only require to be translated across half the circle XCPC for a full integration When a polychromatic source is used the sensor is preferably an energy resolving sensor to minimize spectral contamination by allowing different wave lengths to be distinguished.

In FIG. 22 is shown a diffractometer 211 in accordance with the invention. The diffractometer 210 shown is similar to x-ray apparatus 210 shown in FIG. 5 and features that are substantially similar to features in apparatus 210 are given the same reference number.

One difference from the x-ray apparatus 210 is that the ring collimator 214 is an elongate tubular collimator substantially similar to collimator 15 shown in FIG. 17*a*. The other principle difference is that the sensor collimator 255 is in the form of an annulus which is substantially similar (except for its location and dimensions) to ring collimator 14 rather than the conical configuration of sensor collimator 250 depicted in FIG. 5.

Figure 23A:
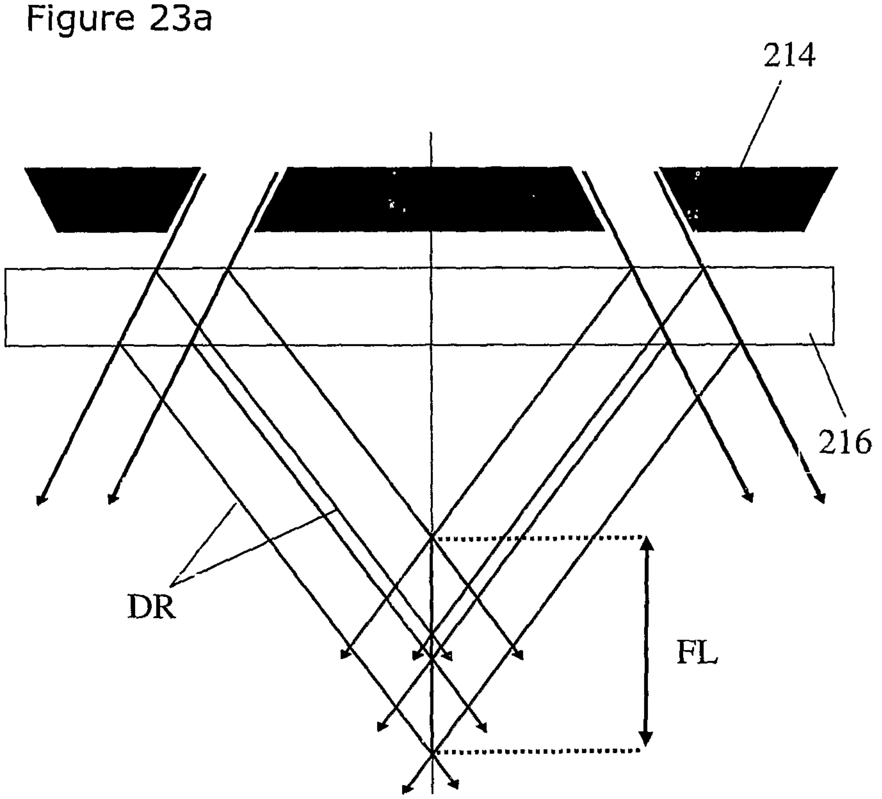
Figure 23B:
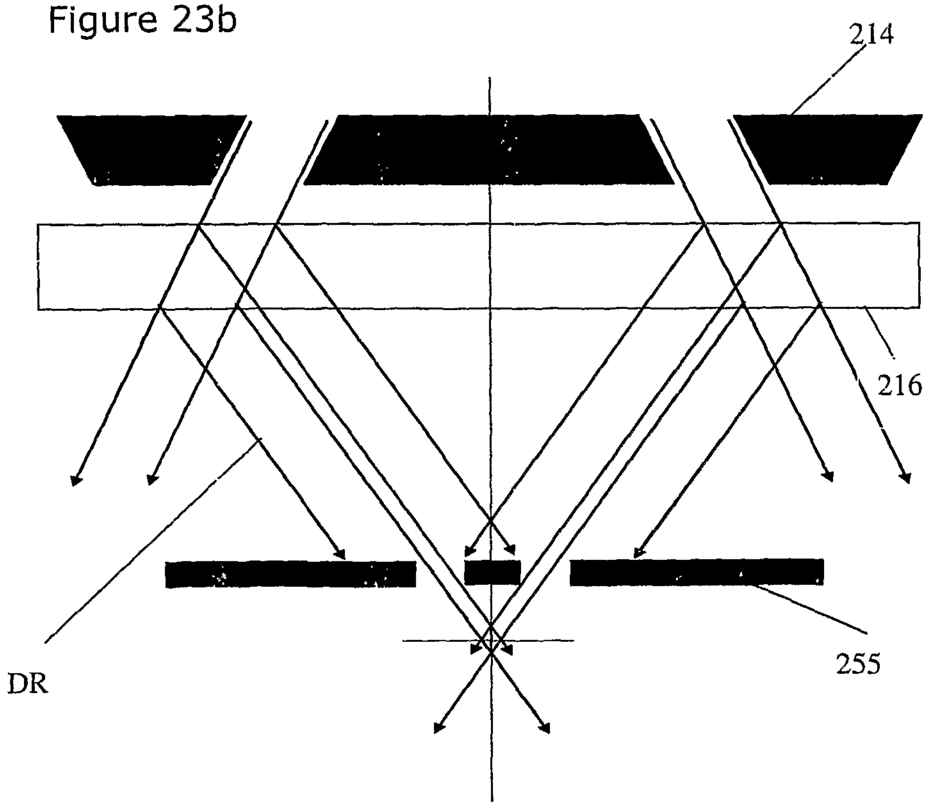

In FIG. 23*a* is shown a cross section of ring collimator 214 and sample 216 with the path of diffracted x-rays DR shown when where there is no sensor collimator 255. Consequently the diffracted rays DR are present from several different depths through the sample 216 causing a reasonably spread out focus length *FL. In contrast in FIG. 23*b* a similar schematic diagram through ring collimator 214 and sample 216 is shown but with the sensor collimator 255 in a suitable location. As can be seen the diffracted rays from most of the points through the sample 216 depth are blocked by the ring collimator 255 with only the diffracted rays DR corresponding to a very limited amount of thickness of the sample 226 going through the annular/conically annular aperture in the sensor collimator 255. Because of this the focus length FL is significantly reduced which enhances the resolution of the diffraction system.

As well as the reasons given above there are various other advantages to use of the invention with a diffractometer. In particular with ordinary use of a diffractometer it is essential that the powder is created with the orientations of the crystals are randomized as much as possible. This is because if significant portion of crystals in the powder are unexpectedly lying in a certain direction and this would skew the results of the amount of diffraction in any given direction. In contrast since the present invention collects Debye cones from around the whole of a circle to any bias of the crystals will be averaged out across the circumference and therefore not skew the result.

In addition, the fact that in order to detect x-rays either or both of the sample detector source are moving along a tubular direction along the axis AX leads to certain advantages in resolution over and above the angular movement in conventional diffractometry.

In use a non obscuring translation stage can be used to carry a single detector 229 along the central axis AX of the system. The diffractometer 211 measures and records scattered radiation intensity and this is translated, thus producing a distance-to sample versus intensity graph. This graph is analogous to the diffractogram produced by a conventional diffraction experiment as each linear translational step can be translated to an angular rotational step. For example the detector angle 20 degrees, an increment of 0.02 degrees corresponds to a lunar translation state of approximately 25 micrometers (assuming a collimator annular radius of 1 cm) and at 10 degrees the same angle of step corresponds to translational step of 116 micrometers. Advantages of such a device over current technology include improved material D spacing resolution at high D spacings (i.e., equivalent to low scattering angles), greater mechanical simplicity through single translation (further, the use of a line detector will negate requirement for any movement) and significant reduction in the physical size of the apparatus while retaining the D spacing resolution.

Figure 24:
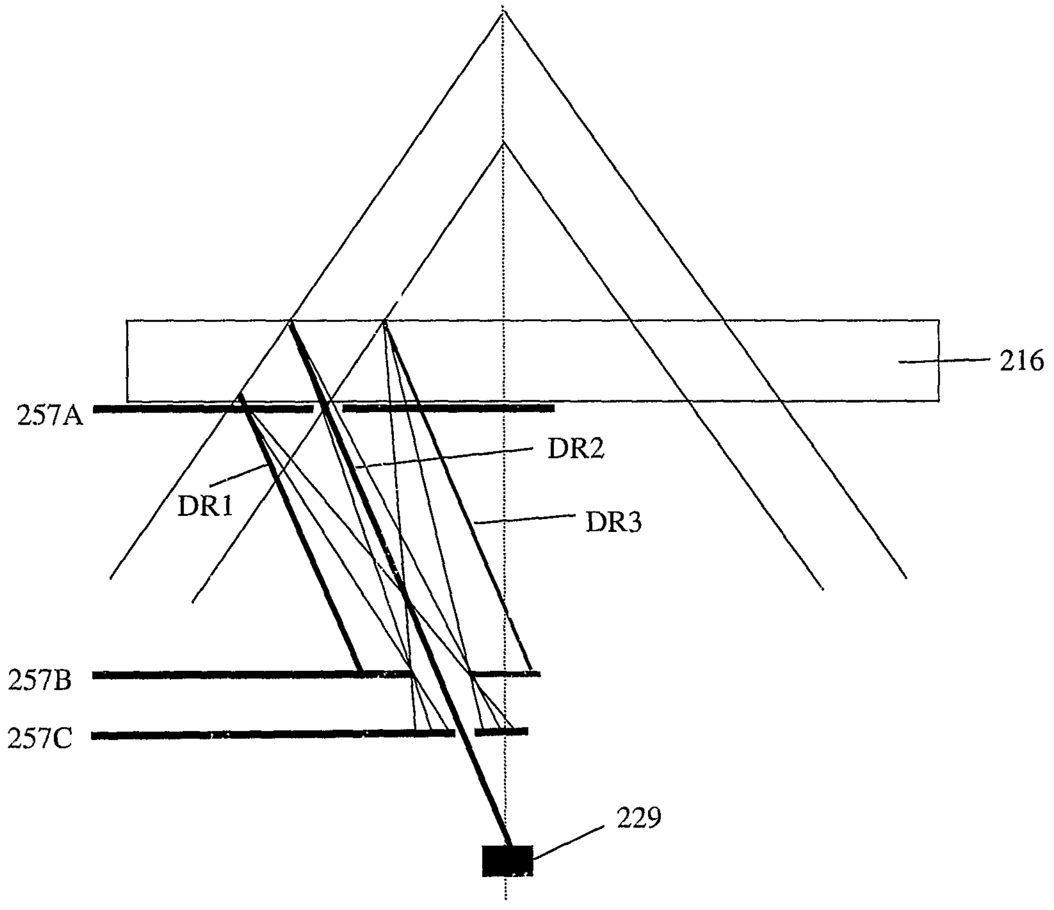
FIG. 24 is a view of an alternate embodiment with three ring collimators.

In FIG. 24 is shown an alternative embodiment wherein the sample collimator comprises three separate ring collimators 257*a*, 257*b*, and 257*c*. Ring collimator 257*b* and 257*a* being located in a similar position to previously described ring collimators 255 and 250. The combination of the two 257*b* and 257*c* results a further reduction in the number of rays which reach the sensor 219 thus increasing resolution. As shown the diffracted rays DR1 and DR3 are cut out and do not reach the sensor 229.

The third ring collimator 257*a* is optional but can be located immediately after the sample 216. Its effect on diffracted rays DR is not explicitly shown but it can be seen that when in use it will cut out many of the diffracted rays from the sample 226 at various depths immediately after they leave the sample 216 and in FIG. 24 would only leave ray DR2 and the accompanying rays form a similar depth in the sample 216. This has considerable advantages though and in some circumstances can be more difficult to correctly locate than other sensor collimators that have been described. It is of particular use where a particular sample or similar samples are examined over a considerable length of time whereby the correct location for collimator 257*a* can be found over time and then the collimator 25*a* left in place.

Figure 25:
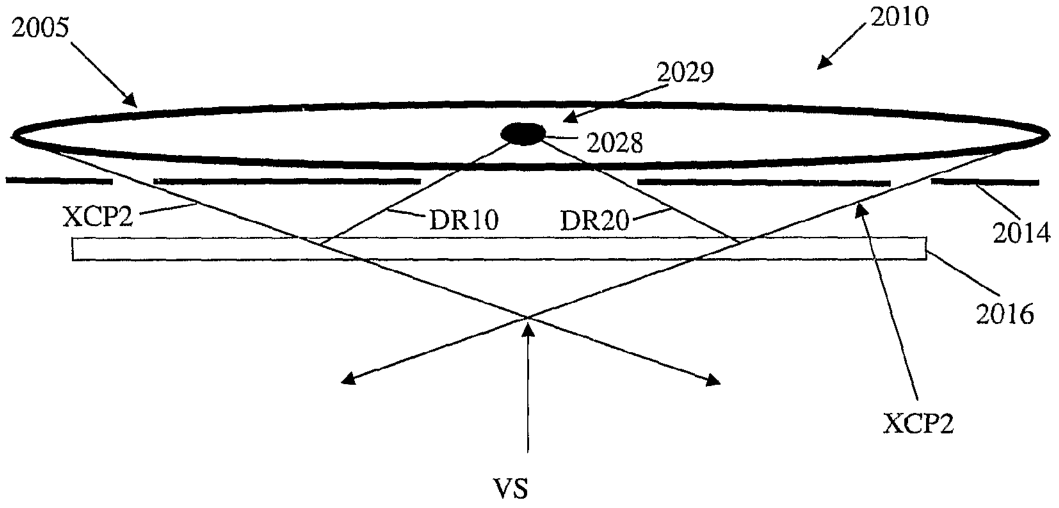
FIG. 25 is a view of an alternate embodiment of a n X-ray apparatus.

In FIG. 25 is shown an alternative embodiment of x-ray apparatus of 2010. Features which are substantially similar to functions featured in embodiment 10 are given the same reference number preceded by 20.

X-ray apparatus 2010 includes a sample 2016 and a sensor 2029. Instead of a single point x-ray source as with previous embodiments the ring source of x-rays 2005 is itself in the shape of an annulus. This ring source 2005 may be a genuine single source continuously along the annulus, or may be a plurality of point sources in annular distribution in order to replicate the effects of an annulus. Source 2005 might be created by producing x-rays in a piece of metal by firing electrons at the metal from an electron gun and moving the electron gun around in a circle very quickly tracing the pattern of a circle onto the piece of metal and resulting in an annular x-ray ring source.

Ring collimator 2014 substantially similar to before except it may have a much larger diameter depending on its location relative top the source and has a further aperture in its centre to allow passage of diffracted rays to the sensor 2029. The annular radius 2024 of the ring collimator 2014 can be straight and cylindrical, alternatively it may be inclined at an angle, but with this embodiment the angle is inclined towards the centre of the ring source 2005 as you move from the ring source 2005 to the sample 2016 rather than inclined away from it as with FIG. 23. The result of the ring collimator 2014 and the ring source 2005 together is that a conical x-ray curtain XCP2 is produced. As with XCP, SCP2 is in the shape of a tubular cone except this time it is focusing and converging towards the centre of the sample 2016 not away from it. In the absence of the sample 2016 the primary x rays in the curtain SCP2 would at some point meet.

The conical curtain XCP2 hits the target object 2016 along a circular target path 2026. Some of these x-rays will be scattered by the lattice of the target object 2516 by Bragg. diffraction and depending on the thickness of the sample 2016 much of the primary x-ray will continue. The substantially continuous x-ray curtain XCP'2 continue to meet at a single point, the apex of the tubular cone XCP' at point VS which for reasons discussed below stands for "virtual source".

In the embodiment 2010 described the sensor 2029 is located substantially in the centre of the ring source 2005 and is therefore on the opposite side of the sample 2016 to the virtual source VS and therefore does not detectany of the primary beam.

As before the Debye cones are generated from every point along the circular target path 2026 so long as the crystal structure is present. Two such Debye cones are marked in FIG. 25 as DR10 and DR20. For similar reasons to before it is found that a hotspot 2028 can be generated provided distance Z is set correctly and for this reason the detector 2029 is designed to be coincident with hotspot 2028. As also shown apparatus 2010 is set up so the sensor 2029 is substantially coincident with the ring source XR for the advantage as best seen with embodiment 26. There is no reason that they have to be coincident with the x-ray source, though depending on the type of source used it may be easier for the sensor 2029 to be located between the source 2005 and sample 2016 rather than on the opposite side of the source 2005.

Ring collimator 2014 can double as a sensor collimator cutting out diffracted rays that aren't part of the desired Debye cones DR10 and DR20. For these reason alternative collimators 2014 may have additional discs and annular apertures.

Figure 26:
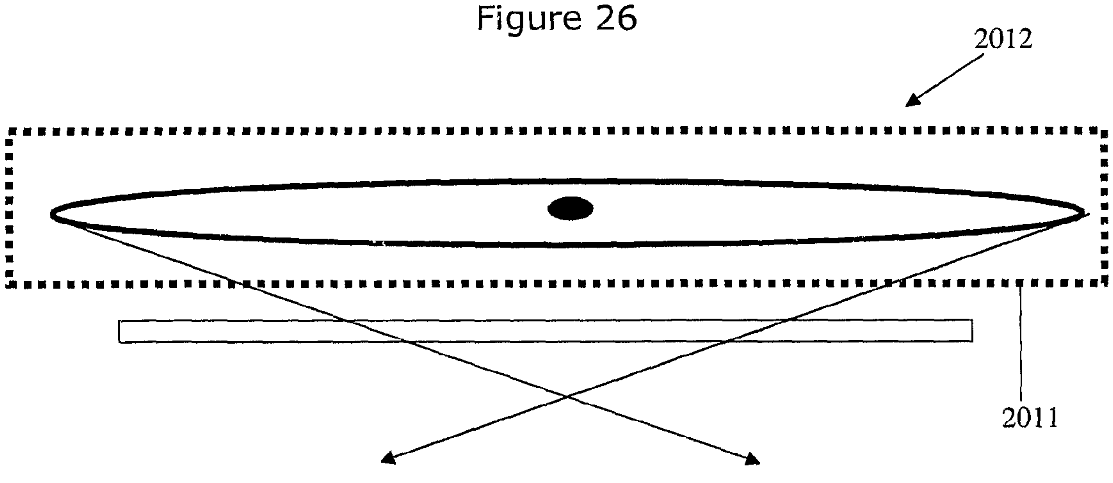
FIG. 26 is a view of an alternate embodiment of a n X-ray apparatus with a housing surrounding the ring source, ring collimator and sensor.

In FIG. 26 is shown apparatus 2012 which is substantially identical to apparatus 2010 except it has a housing 2011 which surrounds the ring source 2005, the ring collimator 2014 and the sensor 2026.

It has similar advantages to the embodiment of apparatus 510 shown in FIG. 8 in that the housing 2011 can be transported as a single unit and used in various samples without having to set up any equipment behind the sample 2016. It is particularly advantageous where the sample is so thick or so dense that it blocks out so substantially all of the x-rays and therefore where embodiments which rely on the sensor being on the far side of the sample are either impractical or impossible.

An additional advantage of embodiment 2010 however is that unlike apparatus 510 which relies on only on back-scattered Debye cones, the Debye cones DR10 and DR20 which converge onto the sensor 2026 are in fact forward scattered from the curtain XCP2 not back scattered. The front scattered cones with them being located on the nearside of the sample 2016 because of the angle at which the x-ray curtain XCP2 approaches the target object 2016. In general it is found that forward scattered Debye cones result in more and better quality information.

Figure 27:
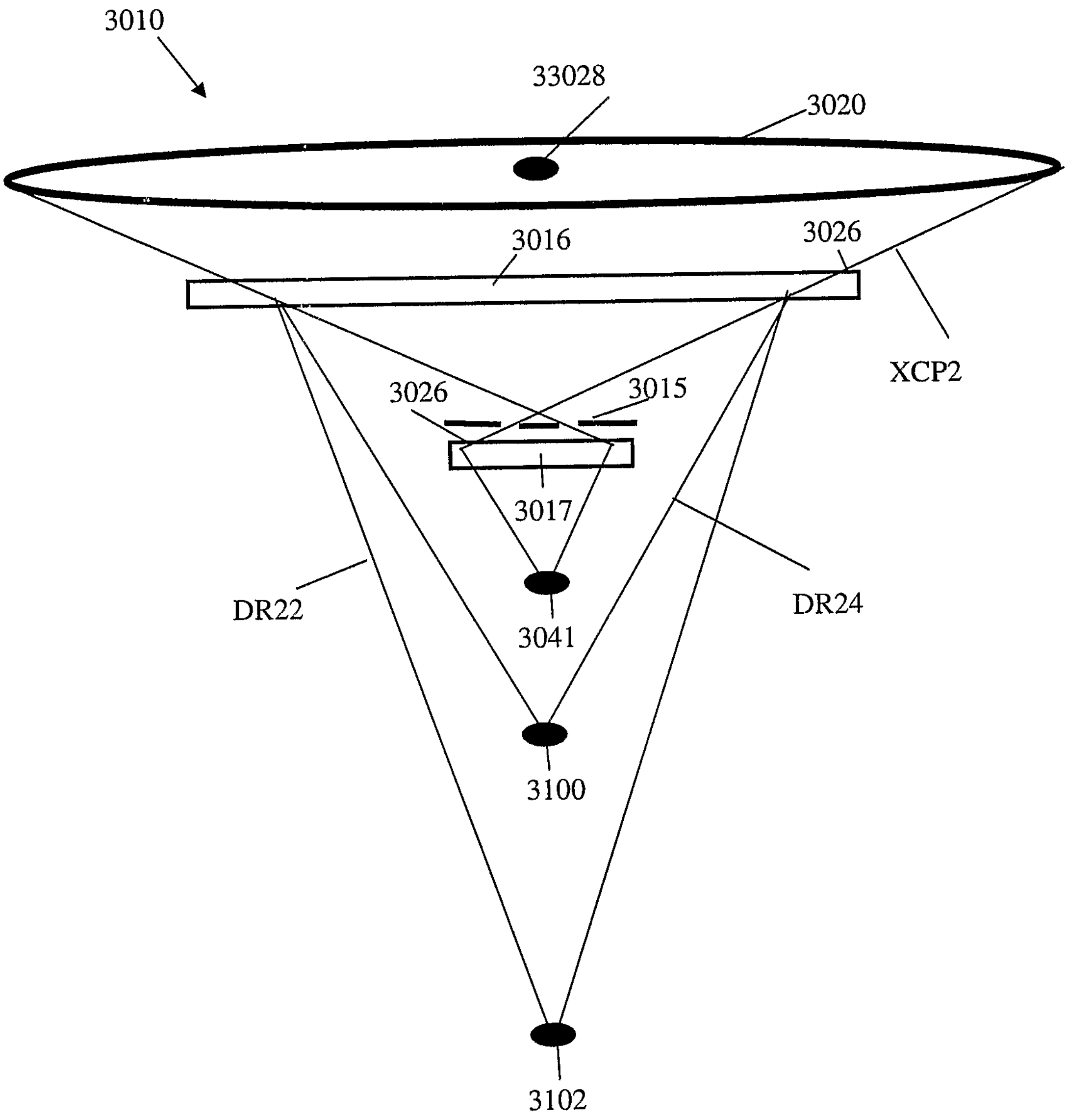
FIG. 27 is a view of a further alternate embodiment of a ring source based apparatus.

In FIG. 27 is shown a second embodiment of ring source based apparatus 3010. Here the sensors are not shown but may be located at any of the hotspots. In addition to the hotspot 3028 in the middle of the x-ray source 3020, two additional hotspots 3100 and 3102 are shown behind the sample 3016. These hotspots 3100 and 3102 correspond to the backscattered Debye cones DR22 and DR 24. These additional hotspots are formed because of the way that the Debye cones meet so that there are two separate back scattered hot spots equating to the two points where all of the Debye cones are coincident. Accordingly two different sensors could be provided acquainted to these two different hotspots. Similarly the front scattered Debye cone detected on the nearside of the sample 3016 may also produce two hotspots corresponding to the points at which the Debye cones DR10 and DR20 coincide and sensors can be provided at both these points.

Additionally there is a second target object 3017 provided.

An additional ring collimator 3015 is present between the virtual source VS and the second sample 3017. The virtual source VS at which all of the primary x-rays are formed at a single point acts like a point source in the same way as point source 12 in the earlier embodiments. Accordingly ring collimator 3015 works in the same manner as ring collimator 14 to produce a circular path on the sample of x-rays 3026 but on the second target object 3017.

Suitable detection equipment can be positioned on either or both sides of the second sample 3017 to measure information about materials contained within it such as at hotpot 3041.

Figure 28:
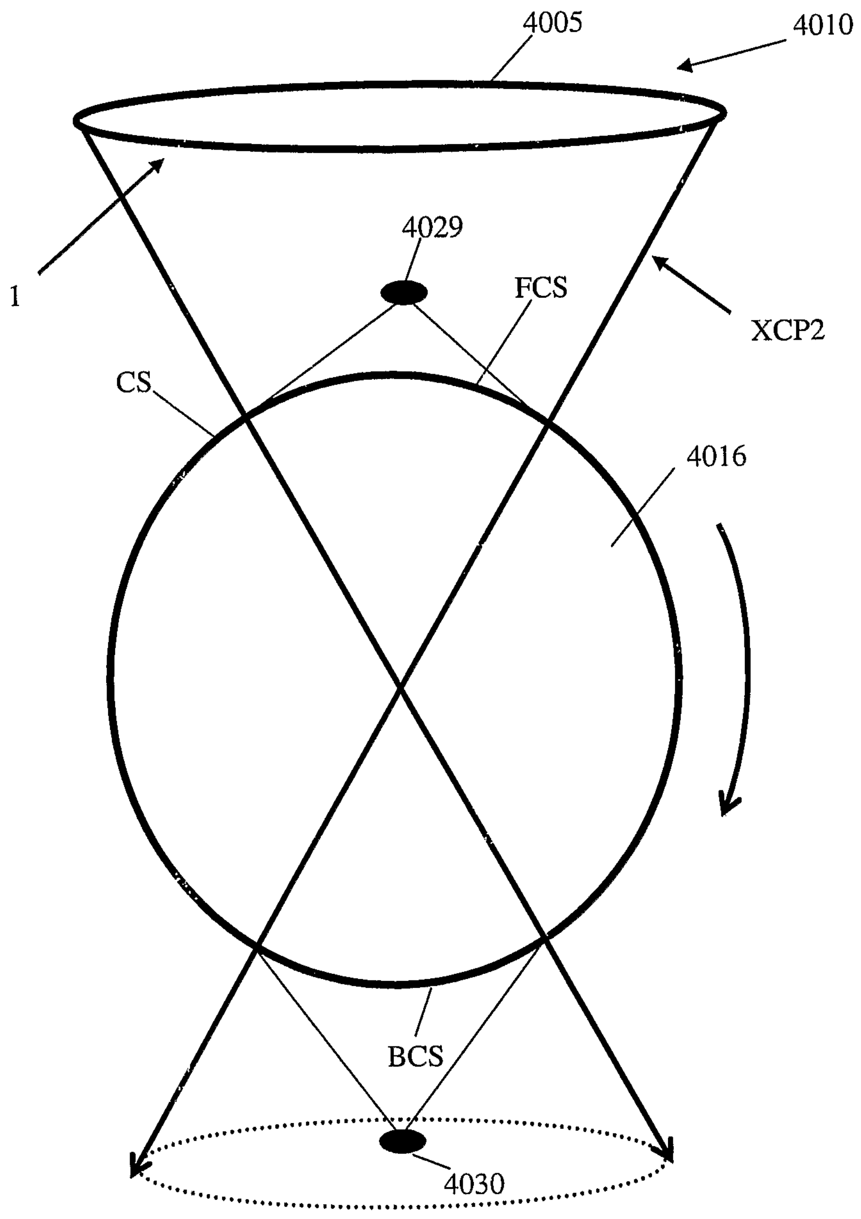
FIG. 28 is a view of an X-ray tomography apparatus.

In FIG. 28 is shown x-ray tomography apparatus 4010 which includes a ring source 4005.

The tomography apparatus 4010 uses a ring source or a plurality point sources 4005 along with a ring collimator producing an x-ray curtain XCP2. In this case the sample 4016 is a solid substantially cylindrical item with the ring source 4005 being positioned so that the x-ray curtain approaches it on its curved side CS. A sensor 4029 is located and a hotspot corresponding to front scattered Debye cones from the front of the curved surface FCS of the sample 4016 and there may also be a sensor located at a hotspot 4030 corresponding to the front scattering from virtual source V. The sensor could also detect primary X rays.

By use of sensor collimators information can be taken relating only to the front surface FCS and the back surface BCS. By causing relative rotational movement between the ring source/ring collimator and the sample 4016 (either by rotating the sample or rotating the source) it is possible to build up an image of a larger using tomography which image includes material information. By rotating the sample slowly by 360 degrees it is possible to build up an image of a layer across the entire circumferential circumference. By then translating the source or sample downwards or upwards sample relative to each other and repeating the 360 degree rotation an image can made of a second layer of curved surface CS. By repeating these translations a complete image of the curved surface CS can be developed which includes information regarding materials from their diffraction properties of crystals and accordingly more useful information is gathered by this tomography than from conventional computer aided tomography (CAT scans).

Instead of translating between rotations it is also possible to trace an alternative path such as a helical path with the processor associated with tomography equipment programmed with suitable software to compile the image accordingly to the chosen trace pattern. The techniques for doing this are reasonably conventional though routine adjustments should be made to account for the annular sample path 4026 from which data is gathered.

Figure 29:
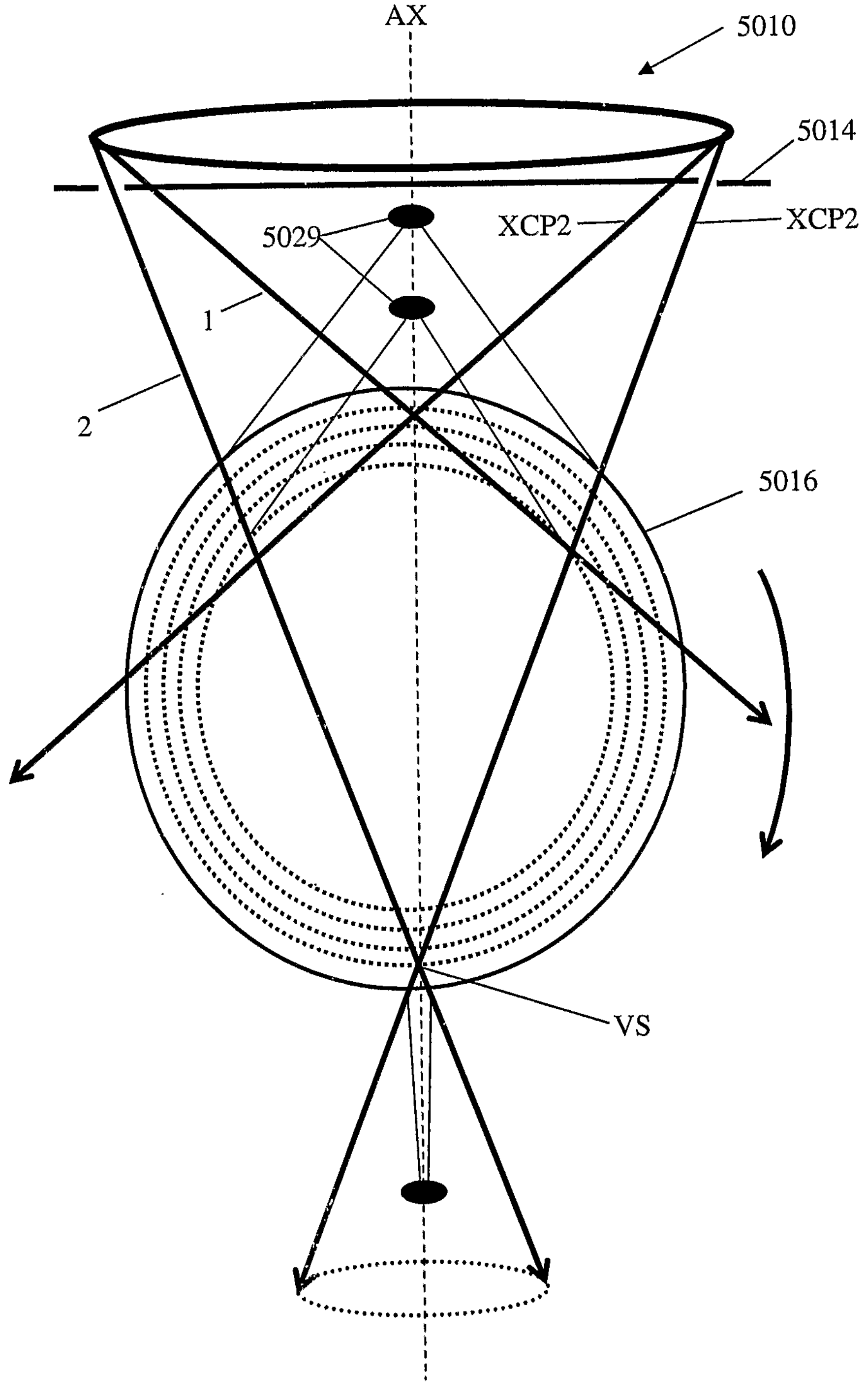
FIG. 29 is a view of an X-ray tomography apparatus with different sensors.

In FIG. 29 is shown tomography apparatus 5010 substantially similar to apparatus 4010. The primary two differences from apparatus 4010 is that firstly there are multiple sensors 5029 located at hotspots corresponding to front scattering from Debye cones at different depths in the sample 5016 and additionally the ring collimator and sensor collimators and ring source are all configured to be adjustable such as bu being movable along axis AX in order to detect different information.

The multiple sensors for different depths allow the inside of the object 5016 to be scanned and images complied using tomography, Additionally the ring collimator 5014 is produced to be adjustable or replaceable so that the angle of the x-ray curtain XCP2 is alterable. As the angle alters the point at which the curtain hits the sample along different depths is also thus allowing for different information to be gathered fro different portions of the sample 5016.

As shown in this example, the collimator has been moved so that the curtain XCP2 moves from a first position '1' to a second position '2'. Not only is the point on the curved surface CS on which the x-ray curtain XCS2 hits the sample altered in the location but virtual source VS is moved from close to the front side of the sample to close to the far side.

An unusual property of the virtual source VS is that it is a point source from which a detection sensor can be made that can be provided within the sample itself. Ordinarily this would not normally be possible. By having adjustable distances to each piece of equipment and/or by having adjustable angle on the ring collimator it is possible to move the virtual source within a sample to any chosen location. In this instance the virtual source VS can be moved slowly from position '1' to position '2' moving right throughout the entire depth of the sample gathering information along its way. This can be combined with rotation and helical spiral paths to map a complete image of a three dimensional object.

Figure 30:
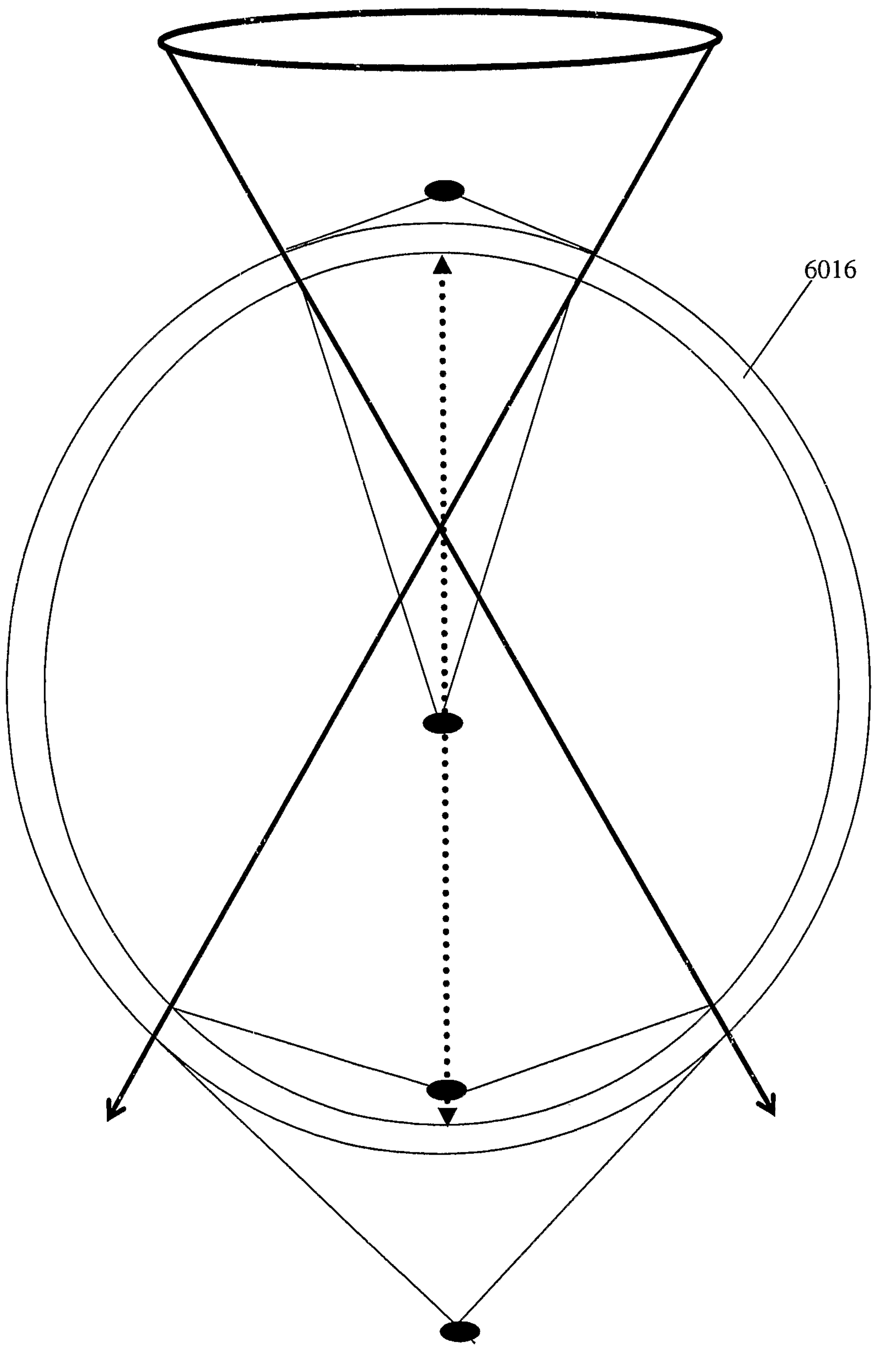
FIG. 30 is a view of an X-ray tomography apparatus having a hollow tube.

In FIG. 30 is shown a similar tomography apparatus but used with a hollow tube 6016 instead of a solid sample. A similar sensor for back and front scattering from the ring source and from front scattering from a virtual point source VS can be used on curved surfaces. Additionally, because the centre is hollow further sensors can be located inside gathering information at hotspots created by backscattered Debye cones.

The invention can be used with other forms of radiation as well as X rays such as neutron or electron beams.

The invention claimed is:

1. Radiation detecting apparatus comprising a collimator and a detector; the detector comprising a sensing element; the collimator comprising:

a central blocking region comprising a material for blocking radiation; and a surrounding transmission region for allowing transmission of said radiation, the surrounding transmission region being a sector of an annulus or a plurality of areas in a configuration in the shape of a sector of an annulus;

the radiation detecting apparatus being configured such that a radiation source is positionable on a side of the collimator opposite the detector and aligned with a center of the central blocking region and the sensing element such that when a sample comprising a crystal material is at a detecting position and the sensing element is at a particular distance from the collimator, the radiation from the aligned radiation source is collimated by the collimator and contacts the sample at a plurality of different locations via the transmission region, and wherein the radiation is blocked from contacting the sample in line with the central region, and Bragg diffracted radiation from the crystal material at two or more of the plurality of locations overlaps at the detector while any primary radiation is collimated away from the sensing element.

2. Radiation detecting apparatus according to claim 1, wherein the Bragg diffracted radiation from the crystal material at most of the plurality of locations overlap at the detector.

3. Radiation detecting apparatus according to claim 1, wherein the Bragg diffracted radiation from the crystal material at three or more of the plurality of locations overlap at the detector.

4. Radiation detecting apparatus according to claim 1, wherein the majority of radiation at the detector is Bragg diffracted.

5. Radiation Detecting apparatus according to claim 1, further comprising a positioning control for adjusting the distance between the detector and collimator.

6. Radiation detecting apparatus according to claim 1, wherein the collimator comprises a substantially annular region or a plurality of regions in a substantially annular configuration for allowing transmission of said radiation.

7. Radiation detecting apparatus according to claim 1, comprising the radiation source spaced an appropriate distance from the collimator.

8. Radiation detecting apparatus according to claim 1 wherein the radiation comprises neutrons or X rays.

9. Radiation detecting apparatus according to claim 1, comprising multiple detectors positioned at multiple depths for detecting Bragg scattered radiation from multiple materials or from multiple depths in the sample.

10. Radiation detecting apparatus according to claim 1, comprising a housing encompassing the detector, collimator, the apparatus configured for the sample to be placed on the opposite side of the detector to the collimator.

11. Radiation detecting apparatus according to claim 1, wherein a second collimator is configured to be between the sample and detector cutting out radiation not from the particular angle corresponding to the desired Bragg diffraction.

12. Radiation detecting apparatus according to claim 11, wherein the second collimator comprises a plurality of portions defining channels for allowing Bragg diffracted radiation from a plurality of predetermined angles, the portions blocking radiation not from those angles.

13. Detecting apparatus according to claim 1, wherein the collimator comprises a plurality of transmission regions, each of the transmission regions comprising an annulus or having a substantially annular configuration of a plurality of areas, the detector or detectors spaced so that scattered radiation from two or more locations formed by each transmission region in the collimator overlap at a detector.

14. Detecting apparatus according to claim 13, wherein the collimator comprises a first element with a plurality of transmission regions, each transmission region of the first element comprising a substantially annular configuration having a plurality of areas, the areas in each of the annular configurations being out of phase with each other and a second element with a plurality of transmission regions, each transmission region of the second element comprising a substantially annular configuration having a plurality of areas, the areas in each of the annular configurations being out of phase with each other, the first and second elements being moveable relative to each other so that one or more of the configurations of the areas align and one or more of the configurations of the areas do not align such that radiation incident onto the collimator is collimated by only some of the configurations.

15. A method of detecting scattered radiation from a sample, comprising the steps of:

generating a curtain of radiation or a plurality of radiation portions in a curtain configuration, placing a sample at a distance from the collimator so that a predetermined profile in the sample is irradiated by a radiation source, and positioning and aligning a sensing element of a radiation detector a distance from the sample so that Bragg scattered radiation from at least two non-adjacent parts of the profile originating from the source overlap at the sensing element.

16. The method of detecting scattered radiation from a sample according to claim 15, further comprising adjusting the distance between the detector and the sample, and searching for an increase in magnitude of detected radiation.

17. The method of detecting scattered radiation from a sample according to claim 16, further comprising finding the distance at which there is maximum overlap between Bragg scattered radiation from non-adjacent parts of the profile.

18. A method according to claim 15, wherein the curtain generated is substantially annular or follows an annular sector and the profile is substantially circular or the sector of a circle.

19. A method according to claim 15, further comprising the steps of translating the sample through the curtain of radiation and integrating the Bragg scattered radiation received from points on the different profiles on the sample formed as it is translated, the Bragg scattered radiation from at least two points on its translation path arriving at substantially the same location at the detector.

* * * * *